US008928287B2

(12) United States Patent
Abe et al.

(10) Patent No.: US 8,928,287 B2
(45) Date of Patent: Jan. 6, 2015

(54) CONTROL APPARATUS, CONTROL APPARATUS NETWORK AND CONTROL METHOD

(75) Inventors: Hiroyuki Abe, Anjo (JP); Tetsuya Hatta, Kuwana (JP)

(73) Assignee: NGK Insulators, Ltd., Nagoya (JP)

( * ) Notice: Subject to any disclaimer, the term of this patent is extended or adjusted under 35 U.S.C. 154(b) by 470 days.

(21) Appl. No.: 13/420,837

(22) Filed: Mar. 15, 2012

(65) Prior Publication Data

US 2012/0176091 A1   Jul. 12, 2012

Related U.S. Application Data

(63) Continuation of application No. PCT/JP2010/066011, filed on Sep. 16, 2010.

(30) Foreign Application Priority Data

Oct. 5, 2009   (JP) .................. 2009-231424

(51) Int. Cl.
H02J 7/00 (2006.01)
G01R 31/36 (2006.01)
G01R 19/00 (2006.01)
G01R 25/00 (2006.01)
H01M 10/48 (2006.01)

(52) U.S. Cl.
CPC ........... H02J 7/0026 (2013.01); H01M 10/486 (2013.01); H02J 7/0018 (2013.01); H02J 7/0022 (2013.01)
USPC ............... 320/132; 320/134; 702/63; 702/64; 702/65

(58) Field of Classification Search
USPC .......... 320/132, 134; 324/426; 702/63, 64, 65
See application file for complete search history.

(56) References Cited

U.S. PATENT DOCUMENTS

| 6,975,095 | B2 * | 12/2005 | Ooi et al. ...................... 320/132 |
| 7,009,363 | B2 * | 3/2006 | Beals et al. .................... 320/117 |
| 7,573,233 | B1 * | 8/2009 | Chow et al. .................... 320/116 |
| 7,638,980 | B2 * | 12/2009 | Zettel et al. ................... 320/150 |
| 8,084,153 | B2 | 12/2011 | Tamakoshi et al. |

(Continued)

FOREIGN PATENT DOCUMENTS

| JP | 10-117447 A1 | 5/1998 |
| JP | 2000-116014 A1 | 4/2000 |

(Continued)

OTHER PUBLICATIONS

International Search Report dated Nov. 22, 2010.

*Primary Examiner* — M'Baye Diao
(74) *Attorney, Agent, or Firm* — Burr & Brown, PLLC

(57) ABSTRACT

A first upper limit and a second upper limit of emission power are set in each of the NaS batteries. The second upper limit is maximum value of the emission power for maintaining the temperature of the NaS battery at an upper limit temperature or less. In allocation of the emission power to each of the NaS batteries, each of the NaS batteries is separated into a preferential virtual battery to which a non-excess of the emission power that does not exceed the second upper limit is allocated and non-preferential virtual battery to which an excess of the emission power that exceeds the second upper limit is allocated, and after the emission power is allocated to all the preferential virtual batteries, the emission power is allocated to each of the non-preferential virtual batteries.

35 Claims, 20 Drawing Sheets

(56) References Cited

U.S. PATENT DOCUMENTS

| | | | |
|---|---|---|---|
| 8,143,859 B2 * | 3/2012 | Iida | 320/134 |
| 8,154,251 B2 * | 4/2012 | Oakes | 320/132 |
| 8,203,311 B2 * | 6/2012 | Takahashi et al. | 320/134 |
| 8,598,848 B2 * | 12/2013 | Zheng et al. | 320/132 |

FOREIGN PATENT DOCUMENTS

| | | |
|---|---|---|
| JP | 2003-125543 A1 | 4/2003 |
| JP | 2008-118790 A1 | 5/2008 |
| JP | 2008-210586 A1 | 9/2008 |

* cited by examiner

F I G . 1
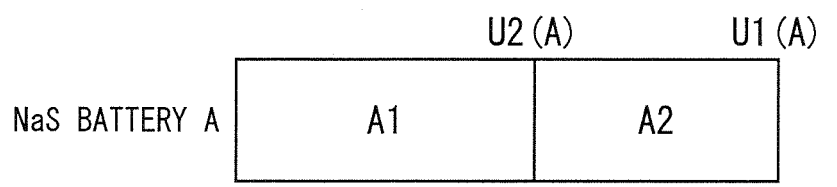
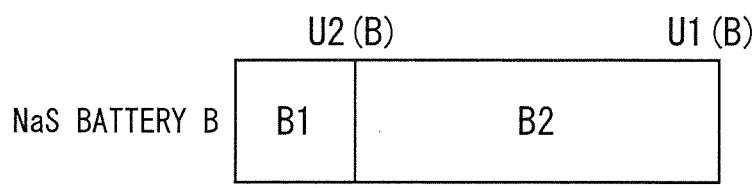
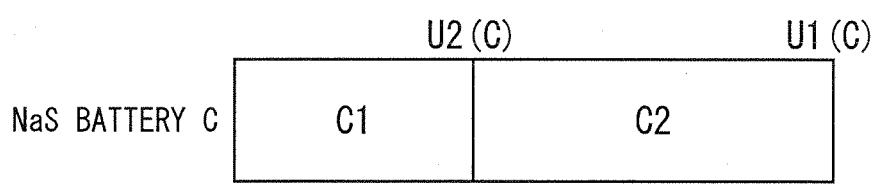
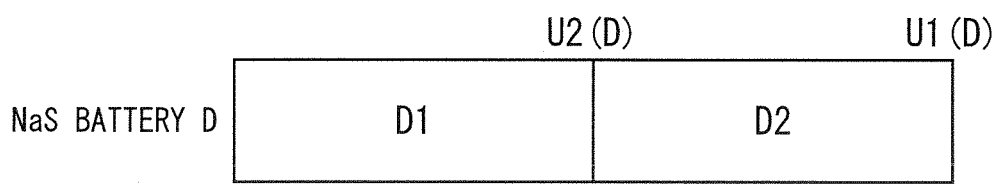

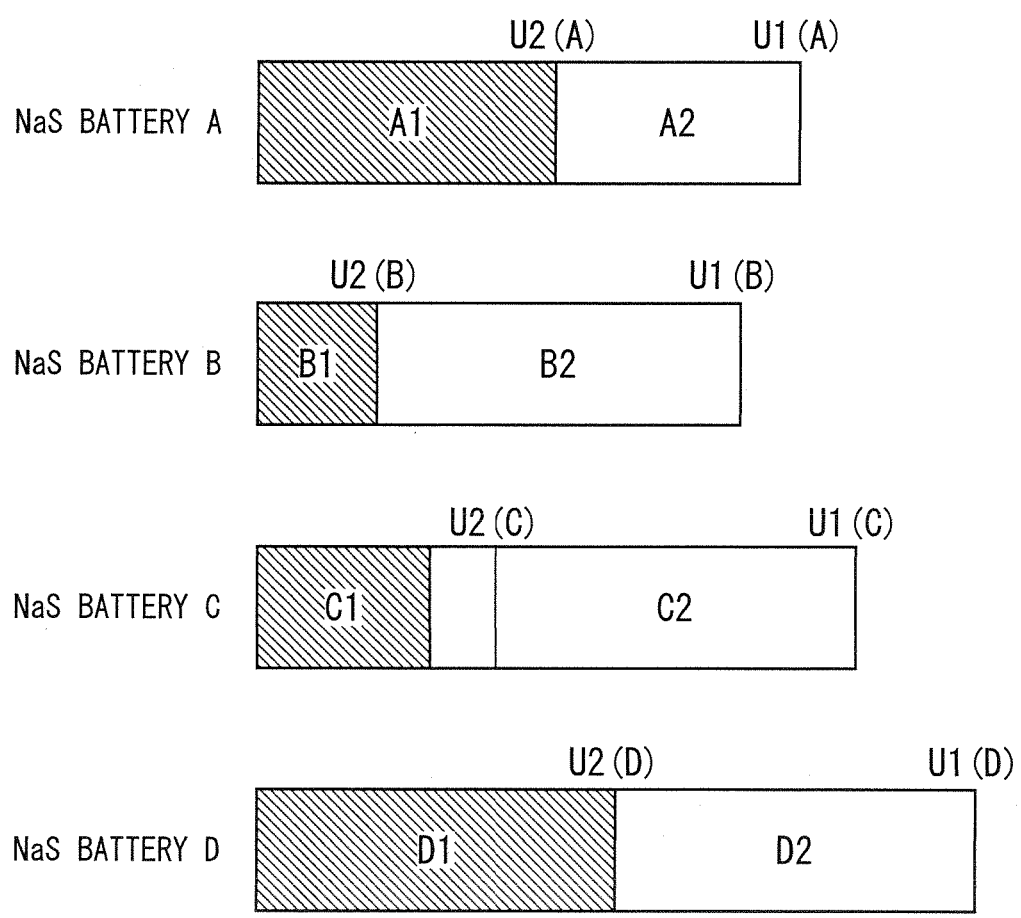

F I G . 4
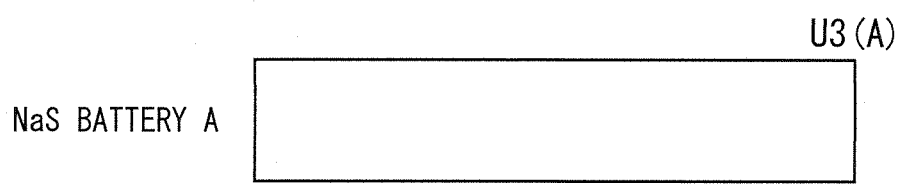
NaS BATTERY A — U3(A)
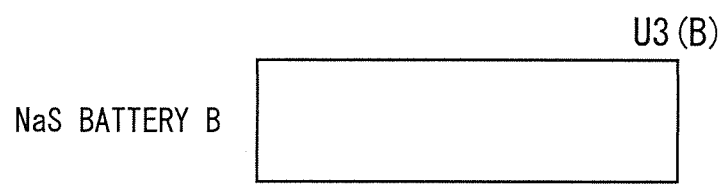
NaS BATTERY B — U3(B)
NaS BATTERY C — U3(C)
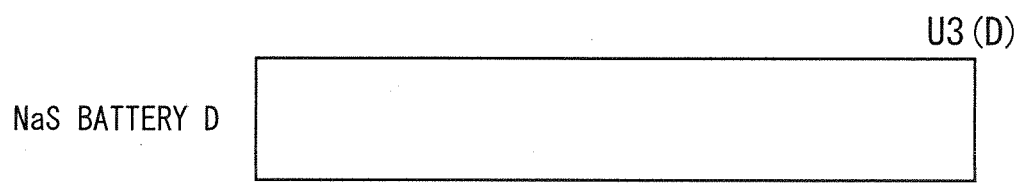
NaS BATTERY D — U3(D)

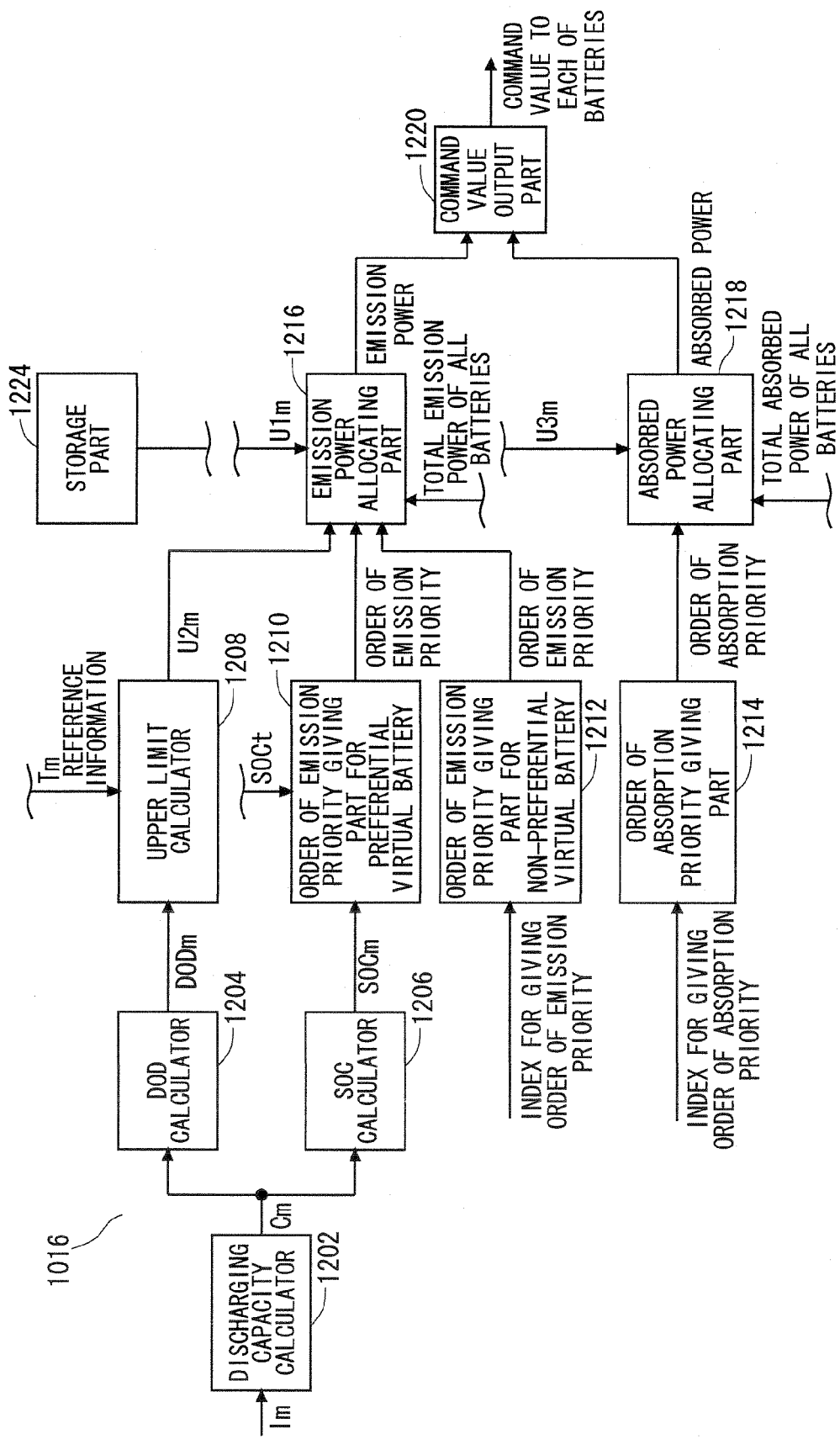
F I G . 7

F I G . 1 0
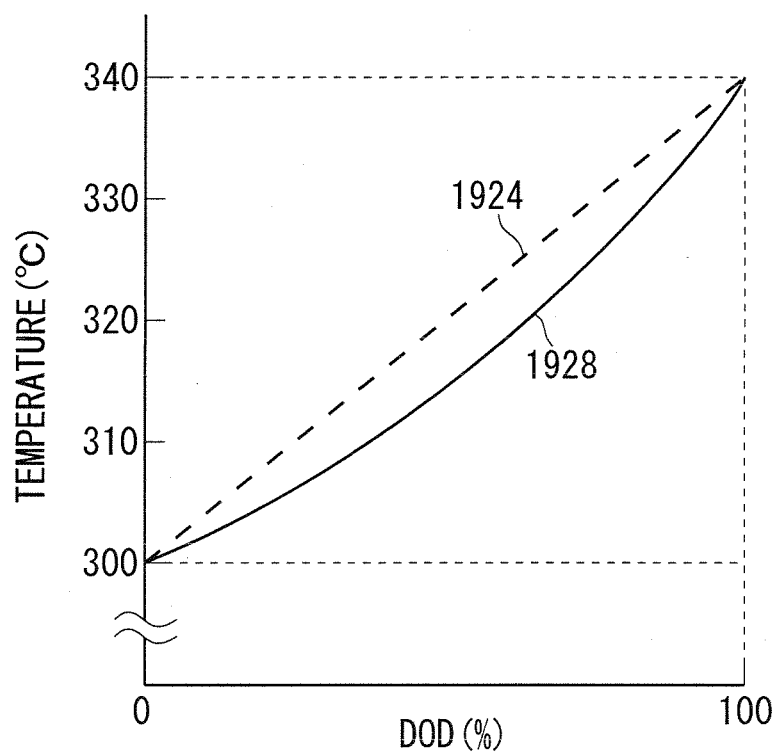

| | T1 | T2 | T3 | T4 | |
|---|---|---|---|---|---|
| NON-PREFERENTIAL VIRTUAL BATTERY A2 | 1 | 4 | 3 | 2 | --- |
| NON-PREFERENTIAL VIRTUAL BATTERY B2 | 2 | 1 | 4 | 3 | --- |
| NON-PREFERENTIAL VIRTUAL BATTERY C2 | 3 | 2 | 1 | 4 | --- |
| NON-PREFERENTIAL VIRTUAL BATTERY D2 | 4 | 3 | 2 | 1 | --- |

| DOD (%) | TEMPERATURE (°C) | SECOND UPPER LIMIT (MW) |
|---|---|---|
| 0 | 300 | 0.6 |
| 30 | 305 | 0.8 |
| ⋮ | ⋮ | ⋮ |

F I G . 2 4
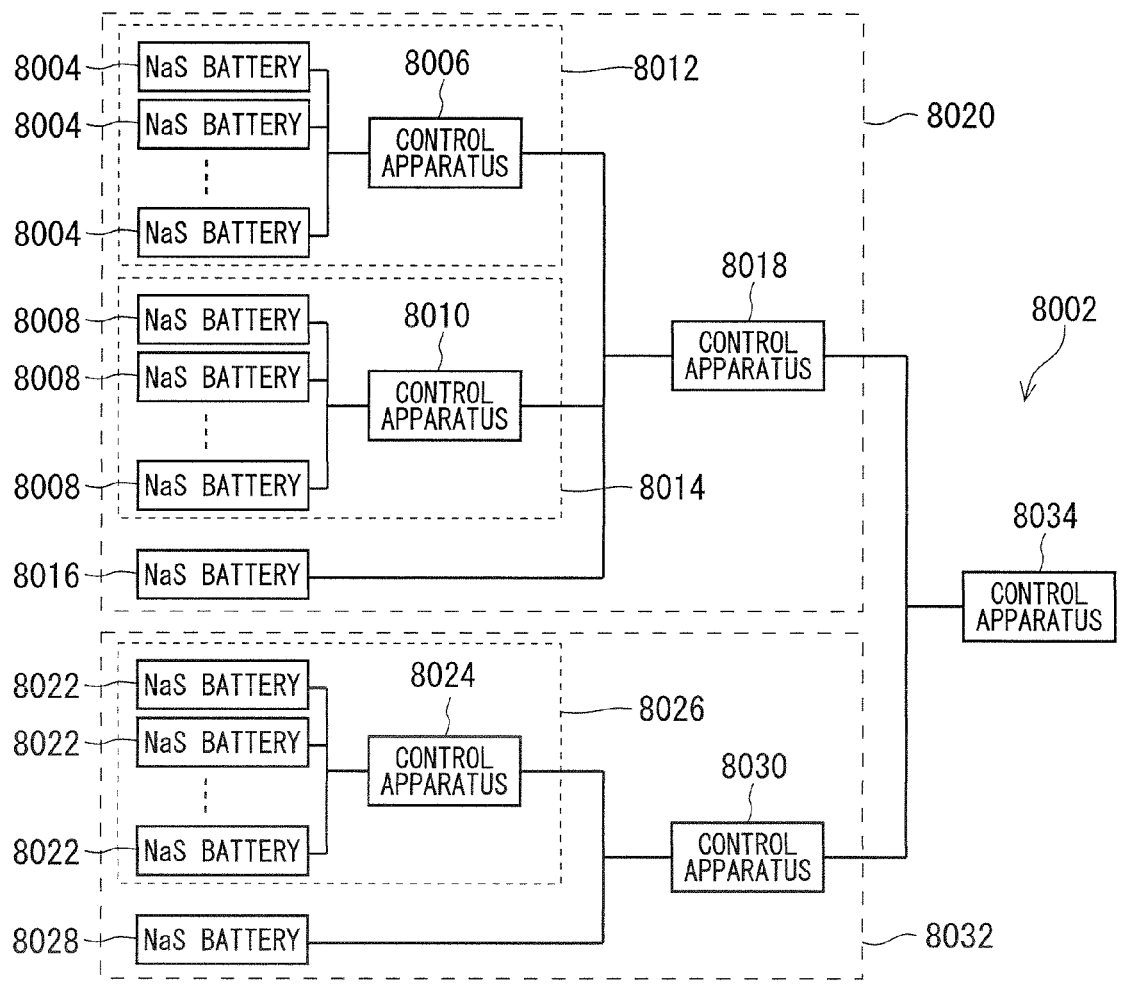

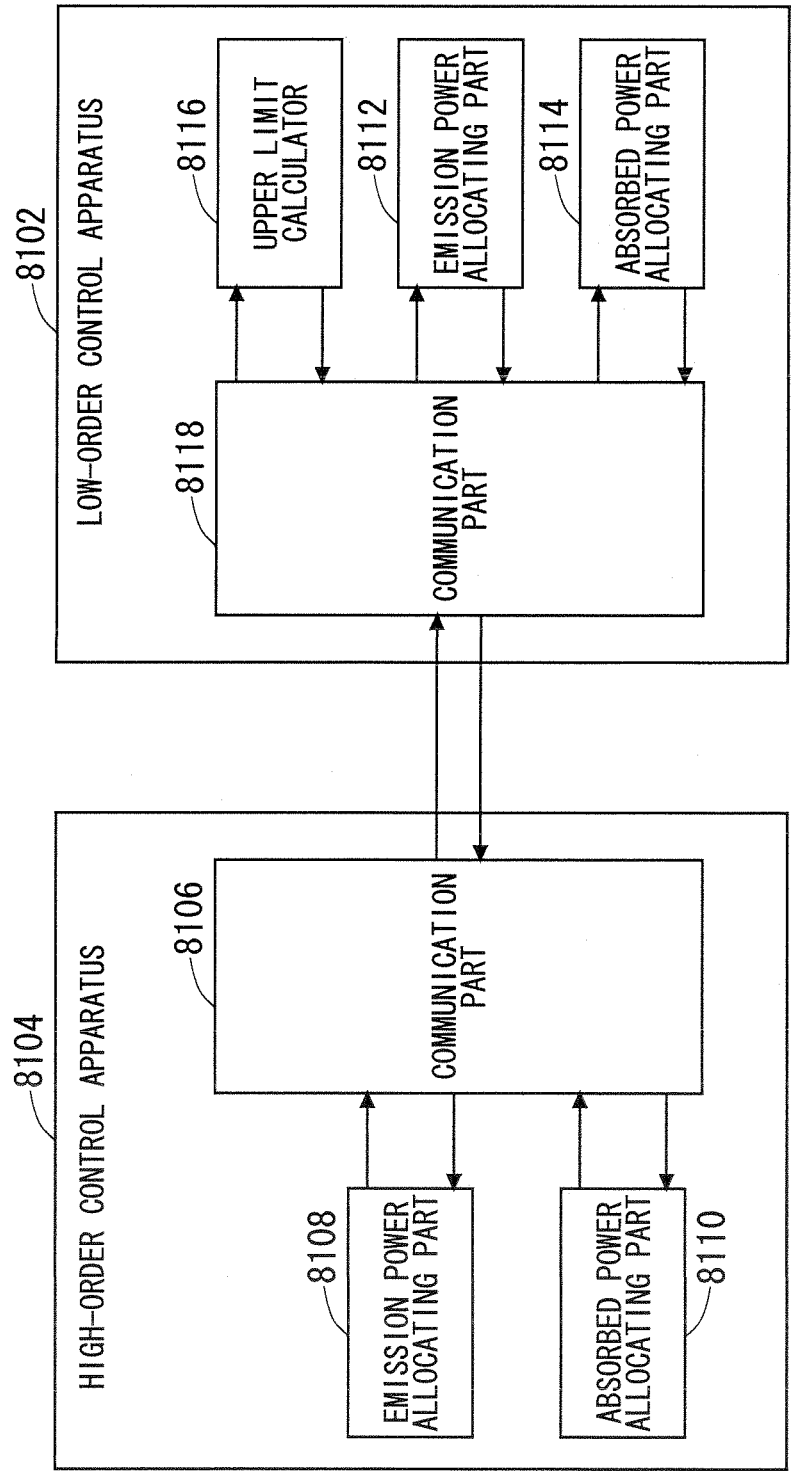

CONTROL APPARATUS, CONTROL APPARATUS NETWORK AND CONTROL METHOD

TECHNICAL FIELD

The present invention relates to a control apparatus for controlling a plurality of secondary batteries, a control apparatus network having a plurality of control apparatuses for controlling a plurality of charging/discharging units, and a control method for controlling a plurality of secondary batteries.

BACKGROUND ART

Patent Document 1 relates to control of sodium-sulfur batteries (hereinafter, "NaS batteries"). Patent Document 1 refers that a guidance such that emission power should be changed is output when a temperature of each of NaS batteries is assumed to become an upper limit temperature or more.

PRIOR ART DOCUMENT

Patent Document

Patent Document 1: Japanese Patent Application Laid-Open No. 2008-210586

SUMMARY OF THE INVENTION

Problems to be Solved by the Invention

In conventional control of NaS batteries, when a plurality of NaS batteries are controlled, imbalance such that a temperature of one NaS battery reaches an upper limit temperature whereas a temperature of another NaS battery falls to well below the upper limit temperature occasionally occurs. This imbalance causes a problem that emission of power from each of NaS batteries whose SOC (state-of-charge) does not reach 0% should be stopped. This problem is caused not only in NaS batteries but also in a case where secondary batteries that cause an exothermic reaction at the time of discharging and cause an endothermic reaction at the time of charging are controlled.

The present invention has been devised in order to solve this problems, and an object thereof is to provide a control apparatus, a control apparatus network and a control method that inhibit imbalance such that a temperature of one secondary battery reaches an upper limit temperature whereas a temperature of another secondary battery falls to well below the upper limit temperature.

Means for Solving the Problems

According to a first aspect of the present invention, a control apparatus for controlling a plurality of secondary batteries includes a charging/discharging current measuring part for measuring a charging/discharging current in each of the plurality of secondary batteries, a temperature sensor for measuring a temperature in each of the plurality of secondary batteries, a depth-of-discharge calculator for calculating a depth-of-discharge of each of the plurality of secondary batteries based on a measured value of the charging/discharging current measured by the charging/discharging current measuring part, an emission power allocating part for allocating emission power not more than a first upper limit to each of the plurality of secondary batteries, an upper limit calculator for calculating a second upper limit of the emission power with which the temperature is maintained at an upper limit temperature or less based on the measured value of the temperature measured by the temperature sensor and the calculated value of the depth-of-discharge calculated by the depth-of-discharge calculator in each of the plurality of secondary batteries, a command value output part for outputting a command value of emission/absorbed power, and a bidirectional converter for controlling charging/discharging in each of the plurality of secondary batteries so that the absorbed/emission power becomes the command value output by the command value output part, wherein the emission power allocating part separates each of the plurality of secondary batteries into a preferential virtual batttery to which a non-excess of the emission power that does not exceed the second upper limit calculated by the upper limit calculator is allocated and a non-preferential virtual battery to which an excess of the emission power that exceeds the second upper limit calculated by the upper limit calculator is allocated, allocates the emission power to all the plurality of preferential virtual batteries and then allocates the emission power to each of the non-preferential virtual batteries, and the command value output part outputs a total of the emission power allocated to each of the preferential virtual batteries by the emission power allocating part and the emission power allocated to each of the non-preferential virtual batteries by the emission power allocating part as the command value.

According to a second aspect of the present invention, in the control apparatus from the first aspect, the upper limit calculator sets a maximum value of the discharging power for enabling continuous discharge until the depth-of-discharge reaches 100% as the second upper limit.

According to a third aspect of the present invention, in the control apparatus from the first aspect, the upper limit calculator sets a maximum value of the emission power for enabling continuous discharge until set time passes as the second upper limit.

According to a fourth aspect of the present invention, in the control apparatus from any one of the first aspect to the third aspect, the upper limit calculator refers to reference information in which a relationship between the depth-of-discharge and the temperature of each of the secondary batteries at the time of discharging is described so as to calculate the second upper limit, and the control apparatus further includes a charging/discharging voltage measuring part for measuring a charging/discharging voltage in each of the plurality of secondary batteries, an internal resistance calculator for calculating an internal resistance in each of the plurality of secondary batteries based on a measured value of the charging/discharging current measured by the charging/discharging current measuring part and a measured value of the charging/discharging voltage measured by the charging/discharging voltage measuring part, and a reference information correcting part for correcting the reference information so that a rate of increase in the temperature to the depth-of-discharge is increased with an increasing calculated value of the internal resistance calculated by the internal resistance calculator.

According to a fifth aspect of the present invention, in the control apparatus from any one of the first aspect to the third aspect, the upper limit calculator refers to reference information in which a relationship between the depth-of-discharge and the temperature of each of the secondary batteries at the time of discharging and the second upper limit is described so as to calculate the second upper limit, and the control apparatus further includes a charging/discharging voltage measuring part for measuring a charging/discharging voltage in each of the plurality of secondary batteries, an internal resistance calculator for calculating an internal resistance in each of the plurality of secondary batteries based on a measured value of the charging/discharging current measured by the charging/discharging current measuring part and a measured value of the charging/discharging voltage measured by the charging/discharging voltage measuring part, and a reference information correcting part for correcting the reference information so that the second upper limit is reduced with an increasing calculated value of the internal resistance calculated by the internal resistance calculator.

According to a sixth aspect of the present invention, in the control apparatus from any one of the first aspect to the third aspect, the upper limit calculator refers to reference information in which a relationship between the depth-of-discharge and the temperature in each of the secondary batteries at the time of discharging is described so as to calculate the second upper limit, and the control apparatus further includes a reference information correcting part for making a correction so that the reference information is brought close to past results of the command value of the emission power output by the command value output part, the calculated value of the depth-of-discharge calculated by the depth-of-discharge calculator and the measured value of the temperature measured by the temperature sensor.

According to a seventh aspect of the present invention, in the control apparatus from any one of the first aspect to sixth aspect, when the emission power is composed of an effective power component and a reactive power component, the emission power allocating part allocates the effective power component and then allocates the reactive power component so that apparent power to be allocated to each of the plurality of secondary batteries becomes the first upper limit or less and effective power to be allocated to each of the plurality of preferential virtual batteries becomes the second upper limit or less calculated by the upper limit calculator.

According to an eighth aspect of the present invention, the control apparatus from any one of the first aspect to the seventh aspect further includes a state-of-charge calculator for calculating a state-of-charge in each of the plurality of secondary batteries based on the measured value of the charging/discharging current measured by the charging/discharging current measuring part, and a first order-of-emission-priority giving part for giving an order-of-emission-priority to each of the plurality of preferential virtual batteries, wherein the emission power allocating part allocates the emission power to each of the preferential virtual batteries in descending manner of the order-of-emission-priority given by the first order-of-emission-priority giving part, and the first order-of-emission-priority giving part raises the order-of-emission-priority with an increasing difference of a calculated value of the state-of-charge in each of secondary batteries including the preferential virtual batteries calculated by the state-of-charge calculator from a target value.

According to a ninth aspect of the present invention, the control apparatus from any one of the first aspect to the seventh aspect further includes a state-of-charge calculator for calculating a state-of-charge in each of the plurality of secondary batteries based on the measured value of the charging/discharging current measured by the charging/discharging current measuring part, and a first emission-priority-degree-segment determiner for carrying out stratification on the plurality of preferential virtual batteries and determining an emission-priority-degree-segment to which each of the plurality of preferential virtual batteries belongs, wherein the emission power allocating part allocates the emission power to each of the preferential virtual batteries in descending manner of the belonging emission-priority-degree-segment determined by the first emission-priority-degree-segment determiner, and the first emission-priority-degree-segment determiner raises the emission-priority-degree-segment with an increasing difference of calculated value of state-of-charge in each of the secondary batteries including the preferential virtual battery calculated by the state-of-charge calculator from a target value.

According to a tenth aspect of the present invention, the control apparatus from the ninth aspect further includes a first intra-segment-order-of-emission-priority giving part for giving an intra-segment-order-of-emission-priority to each of the preferential virtual batteries in each of the emission-priority-degree-segments, wherein the emission power allocating part allocates the emission power to each of the preferential virtual batteries belonging to the same emission-priority-degree-segment in descending manner of the intra-segment-order-of-emission-priority given by the first infra-segment-order-of-emission-priority giving part, and the first intra-segment-order-of-emission-priority giving part raises the intra-segment-order-of-emission-priority with an increasing ratio of the second upper limit of each of the secondary batteries including the preferential virtual batteries calculated by the upper limit calculator to the first upper limit.

According to an eleventh aspect of the present invention, the control apparatus from the ninth aspect further includes a first intra-segment-order-of-emission-priority giving part for giving an intra-segment-order-of-emission-priority to each of the preferential virtual batteries in each of the emission-priority-degree-segments, wherein the emission power allocating part allocates the emission power to each of the preferential virtual batteries belonging to the same emission-priority-degree-segment in descending manner of the intra-segment-order-of-emission-priority given by the first intra-segment-order-of-emission-priority giving part, and the first intra-segment-order-of-emission-priority giving part raises the intra-segment-order-of-emission-priority with a decreasing difference of the measured value of the temperature in each of the secondary batteries including the preferential virtual batteries measured by the temperature sensor from a reference value.

According to a twelfth aspect of the present invention, the control apparatus from the ninth aspect further includes a first intra-segment-order-of-emission-priority giving part for giving an intra-segment-order-of-emission-priority to each of the preferential virtual batteries in each of the emission-priority-degree-segments, wherein the emission power allocating part allocates the emission power to each of the preferential virtual batteries belonging to the same emission-priority-degree-segment in descending manner of the intra-segment-order-of-emission-priority given by the first intra-segment-order-of-emission-priority giving part, and the first intra-segment-order-of-emission-priority giving part raises the intra-segment-order-of-emission-priority with the decreasing measured value of the temperature of each of the secondary batteries including the preferential virtual batteries measured by the temperature sensor.

According to a thirteenth aspect of the present invention, the control apparatus from any one of the first aspect to the twelfth aspect further includes a second order-of-emission-priority giving part for giving an order-of-emission-priority to each of the plurality of non-preferential virtual batteries, wherein the emission power allocating part allocates emission power to each of the non-preferential virtual batteries in descending manner of the order-of-emission-priority given by the second order-of-emission-priority giving part, and the second order-of-emission-priority giving part raises the order-of-emission-priority with an increasing ratio of the second upper limit of each of the secondary batteries including the non-preferential virtual batteries calculated by the upper limit calculator to the first upper limit.

According to a fourteenth aspect of the present invention, the control apparatus from any one of the first aspect to the twelfth aspect further includes a second order-of-emission-priority giving part for giving an order-of-emission-priority to each of the plurality of non-preferential virtual batteries, wherein the emission power allocating part allocates the emission power to each of the non-preferential virtual batteries in descending manner of the order-of-emission-priority given by the second order-of-emission-priority giving part, and the second order-of-emission-priority giving part raises the order-of-emission-priority with a decreasing difference of the measured value of the temperature of each of the secondary batteries including the non-preferential virtual batteries measured by the temperature sensor from a reference value.

According to a fifteenth aspect of the present invention, the control apparatus from any one of the first aspect to the twelfth aspect further includes a second order-of-emission-priority giving part for giving an order-of-emission-priority to each of the plurality of non-preferential virtual batteries, wherein the emission power allocating part allocates the emission power to each of the non-preferential virtual batteries in descending manner of the order-of-emission-priority given by the second order-of-emission-priority giving part, and the second order-of-emission-priority giving part raises the order-of-emission-priority with the decreasing measured value of the temperature of each of the secondary batteries including the non-preferential virtual batteries measured by the temperature sensor.

According to a sixteenth aspect of the present invention, the control apparatus from any one of the first aspect to the twelfth aspect further includes a second emission-priority-degree-segment determiner for carrying out stratification on the plurality of non-preferential virtual batteries and determining an emission-priority-degree-segment to which each of the plurality of non-preferential virtual batteries belongs, wherein the emission power allocating part allocates the emission power to each of the non-preferential virtual batteries in descending manner of the belonging emission-priority-degree-segment determined by the second emission-priority-degree-segment determiner, and the second emission-priority-degree-segment determiner raises the emission-priority-degree-segment with an increasing ratio of the second upper limit of each of the second batteries including the non-preferential virtual batteries calculated by the upper limit calculator to the first upper limit.

According to a seventeenth aspect of the present invention, the control apparatus from any one of the first aspect to the twelfth aspect further includes a second emission-priority-degree-segment determiner for carrying out stratification on the plurality of non-preferential virtual batteries so as to determine an emission-priority-degree-segment to which each of the plurality of non-preferential virtual batteries belongs, wherein the emission power allocating part allocates the emission power to each of the non-preferential virtual batteries in descending manner of the belonging emission-priority-degree-segment determined by the second emission-priority-degree-segment determiner, and the second emission-priority-degree-segment determiner raises the emission-priority-degree-segment with a decreasing difference of the measured value of the temperature of each of the secondary batteries including the non-preferential virtual batteries measured by the temperature sensor from a reference value.

According to an eighteenth aspect of the present invention, the control apparatus from any one of the first aspect to the twelfth aspect further includes a second emission-priority-degree-segment determiner for carrying out stratification on the plurality of non-preferential virtual batteries so as to determine an emission-priority-degree-segment to which each of the plurality of non-preferential virtual batteries belongs, wherein the emission power allocating part allocates the emission power to each of the non-preferential virtual batteries in descending manner of the belonging emission-priority-degree-segment determined by the second emission-priority-degree-segment determiner, and the second emission-priority-degree-segment determiner raises the emission-priority-degree-segment with the decreasing measured value of the temperature of each of the secondary batteries including the non-preferential virtual batteries measured by the temperature sensor.

According to a nineteenth aspect of the present invention, the control apparatus from any one of the sixteenth aspect to the eighteenth aspect further includes a second intra-segment-order-of-emission-priority giving part for giving an intra-segment-order-of-emission-priority to each of the non-preferential virtual batteries in each of the emission-priority-degree-segments and a charging/discharging cycle counter for counting the number of charging/discharging cycles in each of the plurality of secondary batteries, wherein the emission power allocating part allocates the emission power to each of the non-preferential virtual batteries belonging to the same emission-priority-degree-segment in descending manner of the intra-segment-order-of-emission-priority given by the second intra-segment-order-of-emission-priority giving part, and the second intra-segment-order-of-emission-priority giving part raises the intra-segment-order-of-emission-priority with the decreasing the number of charging/discharging cycles in each of the secondary batteries including the preferential virtual batteries counted by the charging/discharging cycle counter.

According to a twentieth aspect of the present invention, the control apparatus from any one of the sixteenth aspect to the eighteenth aspect further includes a second intra-segment-order-of-emission-priority giving part for giving an intra-segment-order-of-emission-priority to each of the non-preferential virtual batteries in each of the emission-priority-degree-segments, wherein the emission power allocating part allocates the emission power to each of the non-preferential virtual batteries belonging to the same emission-priority-degree-segment in descending manner of the intra-segment-order-of-emission-priority given by the second intra-segment-order-of-emission-priority giving part, and the second intra-segment-order-of-emission-priority giving part cyclically shuffles each of the intra-segment-orders-of-emission-priority over time.

According to a twenty-first aspect of the present invention, the control apparatus from any one of the first aspect to the sixth aspect further includes an order-of-absorption-priority giving part for giving an order-of-absorption-priority to each of the plurality of secondary batteries and an absorbed power allocating part for allocating absorbed power not more than a third upper limit to each of the plurality of secondary batteries, wherein the absorbed power allocating part allocates the absorbed power to each of secondary batteries in descending manner of the order-of-absorption-priority given by the order-of-absorption-priority giving part, the order-of-absorption-priority giving part raises the order-of-emission-priority with an increasing ratio of the second upper limit calculated by the upper limit calculator to the first upper limit, and the command value output part outputs the absorbed power allocated by the absorbed power allocating part as the command value.

According to a twenty-second aspect of the present invention, the control apparatus from any one of the first aspect to the sixth aspect further includes an order-of-absorption-priority giving part for giving an order-of-absorption-priority to each of the plurality of secondary batteries and an absorbed power allocating part for allocating absorbed power not more than a third upper limit to each of the plurality of secondary batteries, wherein the absorbed power allocating part allocates the absorbed power to each of the secondary batteries in descending manner of the order-of-absorption-priority given by the order-of-absorption-priority giving part, the order-of-absorption-priority giving part raises the order-of-absorption-priority with a decreasing temperature difference of the measured value of the temperature measured by the temperature sensor from a reference value, and the command value output part outputs the absorbed power allocated by the absorbed power allocating part as the command value.

According to a twenty-third aspect of the present invention, the control apparatus from any one of the first aspect to the sixth aspect further includes an order-of-absorption-priority giving part for giving an order-of-absorption-priority to each of the plurality of secondary batteries and an absorbed power allocating part for allocating absorbed power not more than a third upper limit to each of the plurality of secondary batteries, wherein the absorbed power allocating part allocates the absorbed power to each of the secondary batteries in descending manner of the order-of-absorption-priority given by the order-of-absorption-priority giving part, the order-of-absorption-priority giving part raises the order-of-absorption-priority with the decreasing measured value of the temperature measured by the temperature sensor, and the command value output part outputs the absorbed power allocated by the absorbed power allocating part as the command value.

According to a twenty-fourth aspect of the present invention, the control apparatus from any one of the first aspect to the sixth aspect further includes a state-of-charge calculator for calculating a state-of-charge in each of the plurality of secondary batteries based on a measured value of the charging/discharging current measured by the charging/discharging current measuring part, an order-of-absorption-priority giving part for giving an order-of-absorption-priority to each of the plurality of secondary batteries and an absorbed power allocating part for allocating absorbed power not more than a third upper limit to each of the plurality of secondary batteries, wherein the absorbed power allocating part allocates the absorbed power to each of the secondary batteries in descending manner of the order-of-absorption-priority given by the order-of-absorption-priority giving part, the order-of-absorption-priority giving part raises the order-of-absorption-priority with a decreasing difference of a calculated value of the state-of-charge calculated by the state-of-charge calculator from a target value, and the command value output part outputs the absorbed power allocated by the absorbed power allocating part as the command value.

According to a twenty-fifth aspect of the present invention, the control apparatus from any one of the first aspect to the sixth aspect further includes an absorption-priority-degree-segment determiner for carrying out stratification on the plurality of secondary batteries so as to determine an absorption-priority-degree-segment to which each of the plurality of secondary batteries belongs and an absorbed power allocating part for allocating absorbed power not more than a third upper limit to each of the plurality of secondary batteries, wherein the absorbed power allocating part allocates the absorbed power to each of the secondary batteries in descending manner of the belonging absorption-priority-degree-segment determined by the absorption-priority-degree-segment determiner, the absorption-priority-degree-segment determiner raises the absorption-priority-degree-segment with an increasing ratio of the second upper limit calculated by the upper limit calculator to the first upper limit, and the command value output part outputs the absorbed power allocated by the absorbed power allocating part as the command value.

According to a twenty-sixth aspect of the present invention, the control apparatus from any one of the first aspect to the sixth aspect further includes an absorption-priority-degree-segment determiner for carrying out stratification on the plurality of secondary batteries so as to determine an absorption-priority-degree-segment to which each of the plurality of secondary battery belongs and an absorbed power allocating part for allocating absorbed power not more than a third upper limit to each of the plurality of secondary batteries, wherein the absorbed power allocating part allocates the absorbed power to each of the secondary batteries in descending manner of the belonging absorption-priority-degree-segment determined by the absorption-priority-degree-segment determiner, the absorption-priority-degree-segment determiner raises the absorption-priority-degree-segment with a decreasing difference of the measured value of the temperature measured by the temperature sensor from a reference value, and the command value output part outputs the absorbed power allocated by the absorbed power allocating part as the command value.

According to a twenty-seventh aspect of present invention, the control apparatus from any one of the first aspect to the sixth aspect further includes an absorption-priority-degree-segment determiner for carrying out stratification on the plurality of secondary batteries so as to determine an absorption-priority-degree-segment to which each of the plurality of secondary batteries belongs and an absorbed power allocating part for allocating absorbed power not more than a third upper limit to each of the plurality of secondary batteries, wherein the absorbed power allocating part allocates the absorbed power to each of the secondary batteries in descending manner of the belonging absorption-priority-degree-segment determined by the absorption-priority-degree-segment determiner, the absorption-priority-degree-segment determiner raises the absorption-priority-degree-segment with the decreasing measured value of the temperature measured by the temperature sensor, and the command value output part outputs the absorbed power allocated by the absorbed power allocating part as the command value.

According to a twenty-eighth aspect of the present invention, the control apparatus from any one of the first aspect to the sixth aspect further includes a state-of-charge calculator for calculating a state-of-charge in each of the plurality of secondary batteries based on a measured value of the charging/discharging current measured by the charging/discharging current measuring part, an absorption-priority-degree-segment determiner for carrying out stratification on the plurality of secondary batteries so as to determine an absorption-priority-degree-segment to which each of the plurality of secondary batteries belongs, and an absorbed power allocating part for allocating absorbed power not more than a third upper limit to each of the plurality of secondary batteries, wherein the absorbed power allocating part allocates the absorbed power to each of the secondary batteries in descending manner of the belonging absorption-priority-degree-segment determined by the absorption-priority-degree-segment determiner, the absorption-priority-degree-segment determiner raises the absorption-priority-degree-segment with a decreasing difference of the calculated value of the state-of-charge calculated by the state-of-charge calculator from a target value, and the command value output part outputs the absorbed power allocated by the absorbed power allocating part as the command value.

According to a twenty-ninth aspect of the present invention, the control apparatus from any one of the twenty-fifth aspect to the twenty-eighth aspect further includes an intra-segment-order-of-absorption-priority giving part for giving an infra-segment-order-of-absorption-priority to each of the secondary batteries in each of the absorption-priority-degree-segments and a charging/discharging cycle counter for counting the number of a charging/discharging cycles of each of the plurality of secondary batteries, wherein the absorbed power allocating part allocates absorbed power to each of the secondary batteries belonging to the same absorption-priority-degree-segment in descending manner of the intra-segment-order-of-absorption-priority given by the intra-segment-order-of-absorption-priority giving part, and the intra-segment-order-of-absorption-priority giving part raises the intra-segment-order-of-absorption-priority with the decreasing the number of charging/discharging cycles counted by the charging/discharging cycle counter.

According to a thirtieth aspect of the present invention, the control apparatus from any one of the twenty-fifth aspect to the twenty-eighth aspect further includes an intra-segment-order-of-absorption-priority giving part for giving an intra-segment-order-of-absorption-priority to each of the secondary batteries in each of the absorption-priority-degree-segments, wherein the absorbed power allocating part allocates absorbed power to each of the secondary batteries belonging to the same absorption-priority-degree-segment in descending manner of the intra-segment-order-of-absorption-priority given by the intra-segment-order-of-absorption-priority giving part, and the infra-segment-order-of-absorption-priority giving part cyclically shuffles the intra-segment-orders-of-absorption-priority over time.

According to a thirty-first aspect of the present invention, the control apparatus from the twenty-eighth aspect further includes an infra-segment-order-of-absorption-priority giving part for giving an intra-segment-order-of-absorption-priority to each of the secondary batteries in each of the absorption-priority-degree-segments, wherein the absorbed power allocating part allocates the emission power to each of the secondary batteries belonging to the same absorption-priority-degree-segment in descending manner of the intra-segment-order-of-absorption-priority given by the intra-segment-order-of-absorption-priority giving part, and the intra-segment-order-of-absorption-priority giving part raises the intra-segment-order-of-absorption-priority with an increasing ratio of the second upper limit calculated by the upper limit calculator to the first upper limit.

According to a thirty-second aspect of the present invention, the control apparatus from the twenty-eight aspect further includes an intra-segment-order-of-absorption-priority giving part for giving an intra-segment-order-of-absorption-priority to each of the preferential virtual batteries in each of the absorption-priority-degree-segments, wherein the absorbed power allocating part allocates the absorbed power to each of the secondary batteries belonging to the same absorption-priority-degree-segment in descending manner of the intra-segment-order-of-absorption-priority given by the infra-segment-order-of-absorption-priority giving part, and the intra-segment-order-of-absorption-priority giving part raises the intra-segment-order-of-absorption-priority with a decreasing difference of the measured value of the temperature measured by the temperature sensor from a reference value.

According to a thirty-third aspect of the present invention, the control apparatus from the twenty-eighth aspect further includes an intra-segment-order-of-absorption-priority giving part for giving an intra-segment-order-of-absorption-priority to each of the secondary batteries in each of the absorption-priority-degree-segments, wherein the absorbed power allocating part allocates the absorbed power to each of the secondary batteries belonging to the same absorption-priority-degree-segment in descending manner of the intra-segment-order-of-absorption-priority given by the intra-segment-order-of-absorption-priority giving part, and the intra-segment-order-of-absorption-priority giving part raises the intra-segment-order-of-absorption-priority with the increasing measured value of the temperature measured by the temperature sensor.

According to a thirty-fourth aspect of the present invention, a control apparatus network having a plurality of control apparatuses for controlling a plurality of charging/discharging units includes a high-order control apparatus for controlling a plurality of first charging/discharging units and a low-order control apparatus that is provided to all or some of the first charging/discharging units, for controlling a second charging/discharging unit, wherein the high-order control apparatus has a first communication part for communicating with the low-order control apparatus and a first emission power allocating part for allocating emission power to each of the plurality of first charging/discharging units, the first communication part receives a total of a first upper limit of each of the plurality of second charging/discharging units and a total of a second upper limit of each of the plurality of second charging/discharging units from the low-order control apparatus, the first emission power allocating part allocates the emission power that is not more than the total of the first upper limit of each of the plurality of second charging/discharging units received from the communication part to each of the plurality of first charging/discharging units, separates each of the plurality of first charging/discharging units into a preferential virtual battery to which a non-excess of emission power that does not exceed the total of the second upper limit of each of the plurality of first charging/discharging units is allocated and a non-preferential virtual battery to which an excess of emission power that exceeds the total of the second upper limit of each of the plurality of first charging/discharging units is allocated, allocates the emission power to all the plurality of preferential virtual batteries and then allocates the emission power to each of the non-preferential virtual batteries, the low-order control apparatus has a second emission power allocating part for allocating emission power not more than the first upper limit to each of the plurality of second charging/discharging units, an upper limit calculator for calculating a second upper limit of the emission power for maintaining the temperature of each of secondary batteries included in the plurality of second charging/discharging units at an upper limit temperature or less and a second communication part for communicating with the high-order control apparatus, the second emission power allocating part separates each of the plurality of second charging/discharging units into a preferential virtual battery to which a non-excess of the emission power that does not exceed the second upper limit calculated by the upper limit calculator is allocated and a non-preferential virtual battery to which an excess of the emission power that exceed the second upper limit calculated by the upper limit calculator is allocated, allocates the emission power to all the plurality of preferential virtual batteries and then allocates the emission power to each of the non-preferential virtual batteries, and the second communication part transmits a total of the first upper limit in the each of plurality of second charging/discharging units and a total of the second upper limit in each of the plurality of second charging/discharging units to the high-order control apparatus.

According to a thirty-fifth aspect of the present invention, a control method for controlling a plurality of secondary batteries includes the steps of (a) measuring a charging/discharging current in each of the plurality of secondary batteries, (b) measuring a temperature of each of the plurality of secondary batteries, (c) calculating a depth-of-discharge of each of the plurality of secondary batteries based on a measured value of the charging/discharging current measured at the step (a), (d) allocating emission power not more than a first upper limit to each of the plurality of secondary batteries, (e) calculating a second upper limit of the emission power for maintaining the temperature at an upper limit temperature or less based on a measured value of the temperature measured at the step (b) and a calculated value of the depth-of-discharge of each of the plurality of secondary batteries calculated at the step (c) in each of the plurality of secondary batteries, (f) outputting a command value of emission/absorbed power, and (g) controlling charging/discharging of each of the plurality of secondary batteries so that the absorbed/emission power becomes the command value output at the step (f), wherein at the step (d), each of the plurality of secondary batteries is divided into a preferential virtual battery to which a non-excess of the emission power that does not exceed the second upper limit calculated at the step (e) is allocated and a non-preferential virtual battery to which the emission power that exceeds the second upper limit calculated at the step (e) is allocated, the emission power is allocated to all the plurality of preferential virtual batteries and then the emission power is allocated to each of the non-preferential virtual batteries, and at the step (0, a total of the emission power allocated to each of the preferential virtual batteries at the step (d) and the emission power allocated to each of the non-preferential virtual batteries at the step (d) is output as the command value of the emission power.

Effects of the Invention

According to the present invention, since the emission power, that is not more than the second upper limit for maintaining the temperature of each of the plurality of secondary batteries at the upper limit temperature or less, is first allocated to each of the plurality of secondary batteries, imbalance such that the temperature of one secondary battery reaches the upper limit temperature whereas the temperature of another secondary battery falls to well below the upper limit temperature is inhibited.

According to the second aspect of the present invention, since the emission power for enabling continuous discharging until the depth-of-discharge reaches 100% is first allocated to each of the plurality of secondary batteries, each secondary battery is easily discharged until the depth-of-discharge reaches 100%.

According to the third aspect of the present invention, since the discharging power, that is not more than the second upper limit for enabling the continuous discharging until set time passes, is first allocated to each of the plurality of secondary batteries, each of the secondary batteries is easily discharged until the set time passes.

According to the fourth to sixth aspects of the present invention, since the second upper limit becomes smaller with the increasing internal resistance of each of the secondary batteries, the maximum value of the emission power of each of the preferential virtual batteries is suitably set.

According to the seventh aspect of the present invention, the effective power and the reactive power are suitably allocated.

According to the eighth and ninth aspects of the present invention, since the emission power is preferentially allocated to each of the preferential virtual batteries in the secondary batteries where the state-of-charge greatly exceeds the target value, the state-of-charge is easily brought close to the target value.

According to the tenth to twelfth aspects of the present invention, since the emission power is preferentially allocated to each of the preferential virtual batteries in the secondary batteries where the temperature is unlikely to reach the upper limit temperature, a state that the temperature of each of the secondary batteries reaches the upper limit temperature is inhibited.

According to the thirteenth to fifteenth aspects of the present invention, since the emission power is preferentially allocated to each of the non-preferential virtual batteries in the secondary batteries where the temperature is unlikely to reach the upper limit temperature, the state that the temperature of each of the secondary batteries reaches the upper limit temperature is inhibited.

According to the sixteenth to eighteenth aspects of the present invention, since the emission power is preferentially allocated to each of the non-preferential virtual batteries in the secondary batteries where the temperature is unlikely to reach the upper limit temperature, the state that the temperature of each of the secondary batteries reaches the upper limit temperature is inhibited.

According to the nineteenth aspect of the present invention, since the emission power is preferentially allocated to each of the non-preferential virtual batteries in the secondary batteries where the number of the charging/discharging cycles is small, the number of the charging/discharging cycles of each of the secondary batteries is uniformed.

According to the twentieth aspect of the present invention, since the intra-segment-orders-of-emission-priority are cyclically shuffled, the number of the charging/discharging cycles of each of the secondary batteries is uniformed.

According to the twenty-first to twenty-third aspects of the present invention, since the absorbed power is preferentially allocated to each of the secondary batteries where the temperature is unlikely to reach the upper limit temperature, the state that the temperature of each of the secondary batteries reaches the upper limit temperature is inhibited.

According to the twenty-fourth aspect of the present invention, since the absorbed power is preferentially allocated to each of the secondary batteries where the state-of-charge falls to well below the target value, the state-of-charge is easily brought close to the target value.

According to the twenty-fifth to twenty-seventh aspects of the present invention, since the absorbed power is preferentially allocated to each of the secondary batteries where the temperature is unlikely to reach the upper limit temperature, the state that the temperature of each of the secondary batteries reaches the upper limit temperature is inhibited.

According to the twenty-eighth aspect of the present invention, since the absorbed power is preferentially allocated to each of the secondary batteries where the state-of-charge falls to well below the target value, the state-of-charge is easily brought close to the target value.

According to the twenty-ninth aspect of the present invention, since the emission power is preferentially allocated to each of the non-preferential virtual batteries in the secondary batteries where the number of the charging/discharging cycles is small, the number of the charging/discharging cycles of each of the secondary batteries is uniformed.

According to the thirtieth aspect of the present invention, since the intra-segment-orders-of-absorption-priority are cyclically shuffled, the number of the charging/discharging cycles of each of the secondary batteries is uniformed.

According to the thirty-first to thirty-third aspects of the present invention, since the absorbed power is preferentially allocated to each of the secondary batteries where the temperature is unlikely to reach the upper limit temperature, the state that the temperature of each of the secondary batteries reaches the upper limit temperature is inhibited due to Joule heat.

According to the thirty-fourth aspect of the present invention, since the processes executed by one control apparatus reduce, the control of the charging/discharging of many secondary batteries is facilitated.

These and the other objects, features, aspects and advantages of the present invention will be made to be obvious by the detailed description of the present invention when they are taken into consideration with reference to the accompanying drawings.

BRIEF DESCRIPTION OF THE DRAWINGS

FIG. 1 is a pattern diagram describing an outline of allocation of emission power to each of NaS batteries.

FIG. 2 is a pattern diagram describing an example of the allocation of the emission power to each of the NaS batteries.

FIG. 4 is a pattern diagram describing an outline of allocation of absorbed power to each of the NaS batteries.

FIG. 7 is a block diagram illustrating a control part.

FIG. 10 is a diagram illustrating an example of information where the relationship between DOD and the temperatures of the NaS batteries is described.

FIG. 24 is a block diagram illustrating a power storage network according to an eighth embodiment.

FIG. 25 is a block diagram illustrating a high-order control apparatus and a low-order control apparatus according to the eighth embodiment.

EMBODIMENT FOR CARRYING OUT THE INVENTION

<Outline of Allocation of Emission Power and Absorbed Power>

FIG. 1 is a pattern diagram describing an outline of allocation of emission power to four NaS batteries A, B, C and D. As shown in FIG. 1, first upper limits U1(A), U1(B), U1(C) and U1(D), and second upper limits U2(A), U2(B), U2(C) and U2(D) of emission power are set in the NaS batteries A, B, C and D, respectively. The first upper limits U1(A), U1(B), U1(C) and U1(D) are maximum values of the emission power that are determined by specifications of the NaS batteries A, B, C and D or specifications of routes of the emission power emitted from the NaS batteries A, B, C and D. The second upper limits U2(A), U2(B), U2(C) and U2(D) are maximum values of the emission power for maintaining the temperatures of the NaS batteries A, B, C and D at an upper limit temperature or less. The second upper limits U2(A), U2(B), U2(C) and U2(D) are set to be not more than the first upper limits U1(A), U1(B), U1(C) and U1(D), respectively. The first upper limits U1(A), U1(B), U1(C) and U1(D) may be uniform in all the NaS batteries A, B, C and D, or may be different in all or some of the NaS batteries A, B, C and D. The second upper limits U2(A), U2(B), U2(C) and U2(D) also may be uniform in all the NaS batteries A, B, C and D, or may be different in all or some of the NaS batteries A, B, C and D.

In allocation of the emission power to each of the NaS batteries A, B, C and D, each of the four NaS batteries A, B, C and D is separated into preferential virtual batteries A1, B1, C1 and D1 to which a non-excess of the emission power that does not exceed the second upper limits U2(A), U2(B), U2(C) and U2(D) is allocated and non-preferential virtual batteries A2, B2, C2 and D2 to which an excess of the emission power that exceeds the second upper limits U2(A), U2(B), U2(C) and U2(D) is allocated, and after the emission power is allocated to all the preferential virtual batteries A1, B1, C1 and D1, the emission power is allocated to each of the non-preferential virtual batteries A2, B2, C2 and D2. The maximum values of the emission power allocated to the respective preferential virtual batteries A1, B1, C1 and D1 become the second upper limits U2(A), U2(B), U2(C) and U2(D). The maximum values of the emission power to be allocated to the respective non-preferential virtual batteries A2, B2, C2 and D2 become differences U1(A)–U2(A), U1(B)–U2(B), U1(C)–U2(C) and U1(D)–U2(D) between the first upper limits U1(A), U1(B), U1(C) and U1(D) and the second upper limits U2(A), U2(B), U2(C) and U2(D). "The virtual battery" means a unit of allocation of the emission power.

Figure 3:
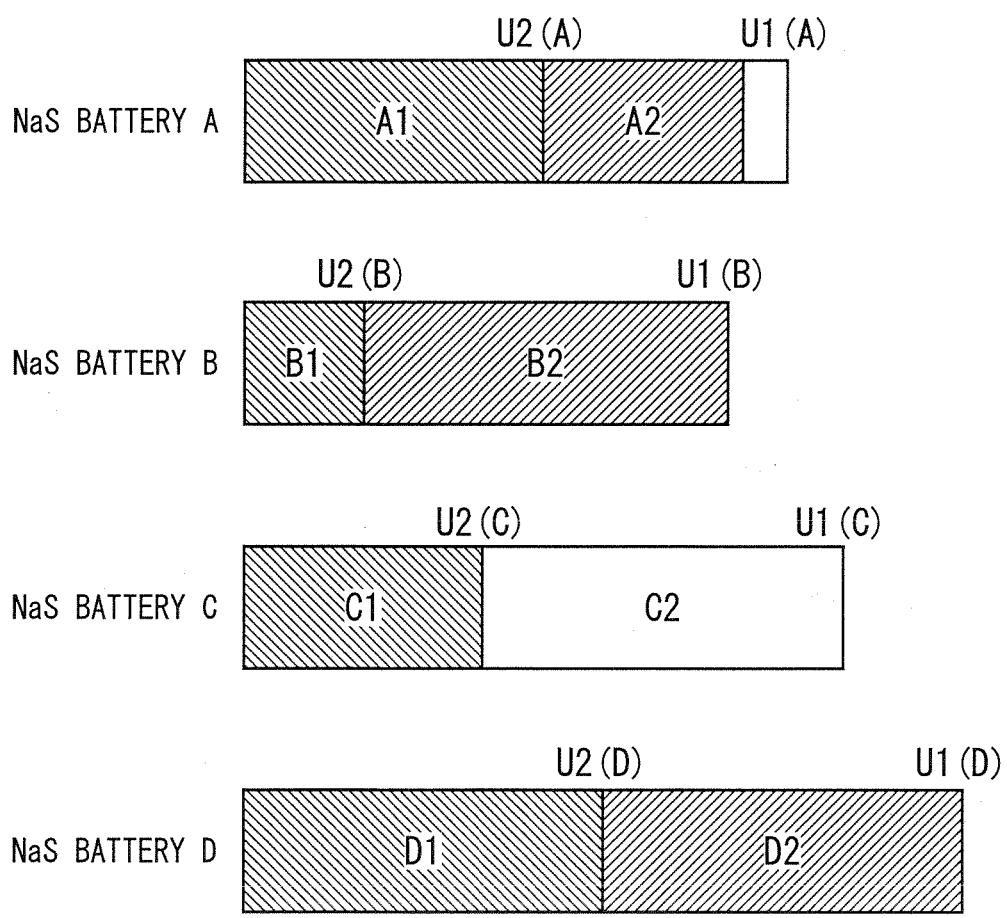
FIG. 3 is a pattern diagram describing an example of the allocation of the emission power to each of the NaS batteries.

FIG. 2 and FIG. 3 are pattern diagrams each describing an example of the allocation of the emission power to each of the NaS batteries A, B, C and D. In FIG. 2 and FIG. 3, hatchings are drawn on portions corresponding to emission power allocated to each of the NaS batteries A, B, C and D.

As shown in FIG. 2, when a total emission power of batteries to be allocated is not more than a total U2(A)+U2(B)+U2(C)+U2(D) of the second upper limits U2(A), U2(B), U2(C) and U2(D), the emission power is allocated to all or some of the preferential virtual batteries A1, B1, C1 and D1, and the emission power is not allocated to the non-preferential virtual batteries A2, B2, C2 and D2. The emission power that is not more than each of the second upper limits U2(A), U2(B), U2(C) and U2(D) is allocated to each of the NaS batteries A, B, C and D. In this case, the temperature of all the NaS batteries A, B, C and D is maintained at the upper limit temperature or less.

On the other hand, as shown in FIG. 3, when the total emission power of the batteries to be allocated is larger than the total U2(A)+U2(B)+U2(C)+U2(D) of the second upper limits U2(A), U2(B), U2(C) and U2(D), the emission power is allocated to all the preferential virtual batteries A1, B1, C1 and D1, and the emission power is allocated to all or some of the non-preferential virtual batteries A2, B2, C2 and D2. The emission power that is not less than each of the second upper limits U2(A), U2(B), U2(C) and U2(D) and not more than each of the first upper limits U1(A), U1(B), U1(C) and U1(D) is allocated to each of the NaS batteries A, B, C and D. In this case, the temperature of each of the NaS batteries including the non-preferential virtual batteries to which the emission power is allocated in the non-preferential virtual batteries A2, B2, C2 and D2 is likely to exceed the upper limit temperature, but the temperature of NaS batteries including the non-preferential virtual batteries to which the emission power is not allocated in the non-preferential virtual batteries A2, B2, C2 and D2 is unlikely to fall to well below the upper limit temperature.

In such allocation of the emission power, since the emission power not more than the second upper limits U2(A), U2(B), U2(C) and U2(D) for maintaining the temperature of each of the NaS batteries A, B, C and D at the upper limit temperature or less is first allocated to each of the NaS batteries A, B, C and D, imbalance such that the temperature of one NaS battery in the NaS batteries A, B, C and D reaches the upper limit temperature, whereas the temperature of another NaS battery in the NaS batteries A, B, C and D falls to well below the upper limit temperature is inhibited.

Priority degrees of the allocation of the emission power in the preferential virtual batteries A1, B1, C1 and D1 may be set in any manner, but it is desirable that they are set with the states of the NaS batteries A, B, C and D including the preferential virtual batteries A1, B1, C1 and D1 being reflected thereto. Priority degrees of the allocation of the emission power in the non-preferential virtual batteries A2, B2, C2 and D2 also may be set in any manner, but it is obviously desirable that they are set with the states of the NaS batteries A, B, C and D including the non-preferential virtual batteries A2, B2, C2 and D2 being reflected thereto.

FIG. 4 is a pattern diagram describing an outline of the allocation of absorbed power to the four the NaS batteries A, B, C and D.

As shown in FIG. 4, third upper limits U3(A), U3(B), U3(C) and U3(D) of the absorbed power are set in the NaS batteries A, B, C and D, respectively. The third upper limits U3(A), U3(B), U3(C) and U3(D) are maximum values of the absorbed power that are determined by the specifications of the NaS batteries A, B, C and D or the specifications of the route of the absorbed power absorbed by the NaS batteries A, B, C and D. The third upper limits U3(A), U3(B), U3(C) and U3(D) may be uniform in all the NaS batteries A, B, C and D, or may be different in all or some of the NaS batteries A, B, C and D. The third upper limits U3(A), U3(B), U3(C) and U3(D) of the absorbed power are the same as or different from the first upper limits U1(A), U1(B), U1(C) and U1(D) of the emission power according to circumstances.

Priority degrees of the allocation of the absorbed power in the NaS batteries A, B, C and D may be set in any manner, but it is desirable that they are set with the states of the NaS batteries A, B, C and D being reflected thereto.

Such allocation of the emission power and the absorbed power is applied also to a case where the number of the NaS batteries is increased or decreased. In general, such allocation of the emission power and the absorbed power is applied to a case where the emission power and absorbed power are allocated to each of the plurality of NaS batteries. Further, such allocation of the emission power and the absorbed power is applied also to a secondary battery other than the NaS battery that causes an exothermic reaction at the time of discharging and causes an endothermic reaction at the time of charging.

First Embodiment

Outline of Power Storage Facility 1002

The first embodiment relates to a power storage facility 1002.

Figure 5:
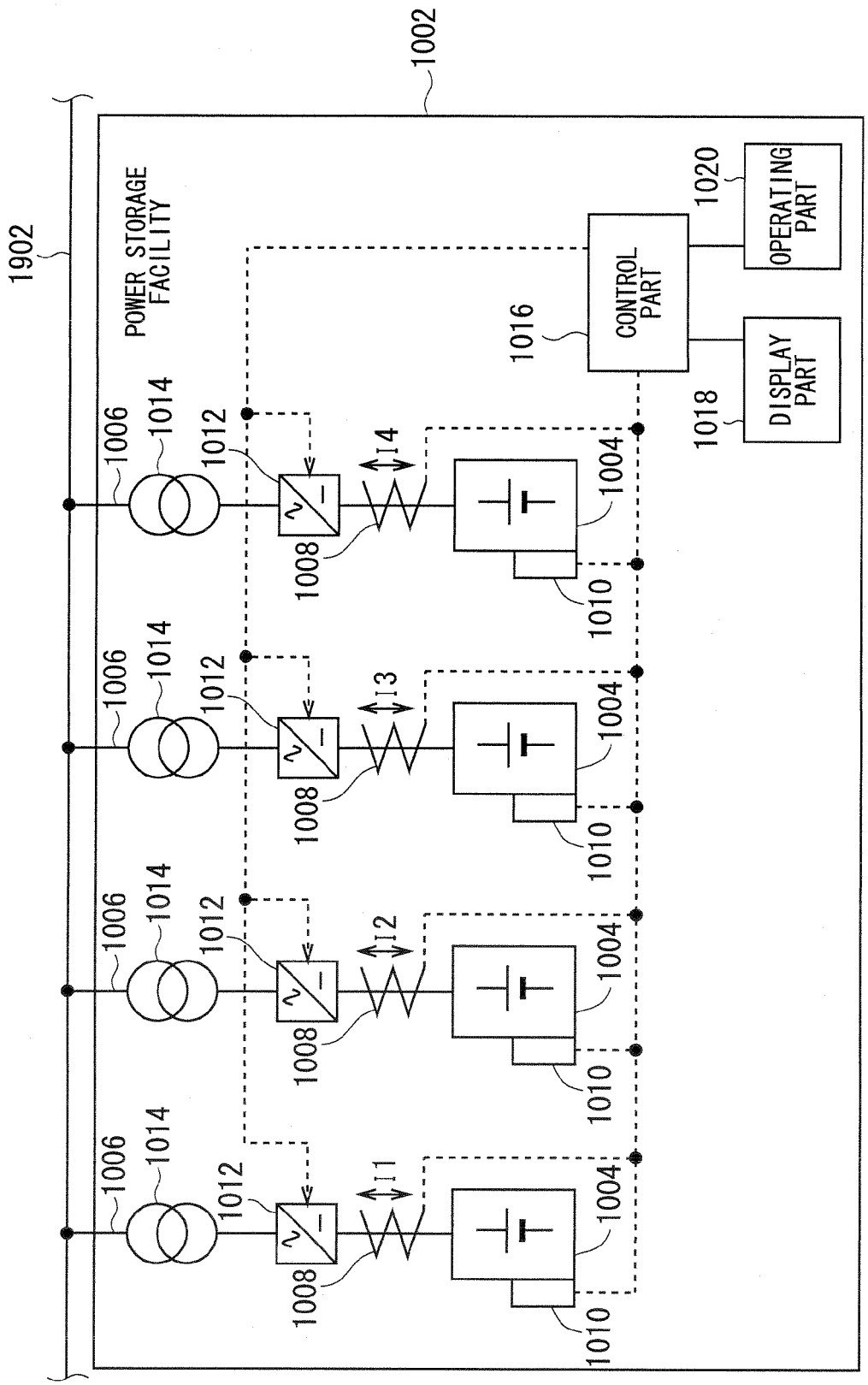
FIG. 5 is a block diagram illustrating a power storage facility according to a first embodiment.

FIG. 5 is a block diagram illustrating the power storage facility 1002 according to a first embodiment.

As shown in FIG. 5, the power storage facility 1002 has the NaS batteries 1004 for storing electric power, connecting lines 1006 for connecting a system 1902 and the NaS batteries 1004, Hall current detectors 1008 for measuring charging/discharging currents of the NaS batteries 1004, temperature sensors 1010 for measuring temperatures of the NaS batteries 1004, bidirectional converters 1012 for converting electric power supplied from the NaS batteries 1004 to the system 1902 from direct currents into alternating currents and converting electric power supplied from the system 1902 to the NaS batteries 1004 from alternating currents into direct currents, transformers 1014 for boosting the electric power supplied from the NaS batteries 1004 to the system 1902 and stepping down the electric power supplied from the system 1902 to the NaS batteries 1004, a control part 1016 for controlling the power storage facility 1002, a display part 1018 for displaying information, and an operating part 1020 for accepting operations.

The connecting lines 1006, the Hall current detectors 1008, the temperature sensors 1010, the bidirectional converters 1012, and the transformers 1014 are provided to each of the plurality of NaS batteries 1004 one by one, respectively, and the Hall current detectors 1008, the bidirectional converters 1012, and the transformers 1014 are inserted into the connecting lines 1006, respectively. The Hall current detectors 1008 are inserted into direct current sides of the bidirectional converters 1012, and the transformers 1014 are inserted into alternating current side of the bidirectional converters 1012, respectively.

The plurality of NaS batteries 1004 are charged/discharged independently. FIG. 5 illustrates the four NaS batteries 1004, but the number of the NaS batteries 1004 is increased or decreased according to specifications of the power storage facility 1002. Another kind of secondary batteries may be adopted instead of the NaS batteries 1004.

The Hall current detectors 1008, the temperature sensors 1010, the bidirectional converters 1012, the transformers 1014, the control part 1016, the display part 1018, and the operating part 1020 compose a control apparatus for controlling the plurality of the NaS batteries 1004. The control part 1016 allocates emission power and absorbed power to each of the plurality of NaS batteries 1004 so that entire emission/absorbed power of the plurality of NaS batteries 1004 (hereinafter, "total emission/absorbed power of all the batteries") takes set values. The set values of the total emission/absorbed power of all the batteries are input from the operating part 1020, or input from a microgrid control system of a microgrid having the power storage facility 1002 via a communication line. In some cases, the set values are set so that input values of the total emission/absorbed power of all the batteries do not directly become the set values and electric power that is consumed in the power storage facility 1002 can be maintained.

(NaS Battery 1004)

Figure 6:
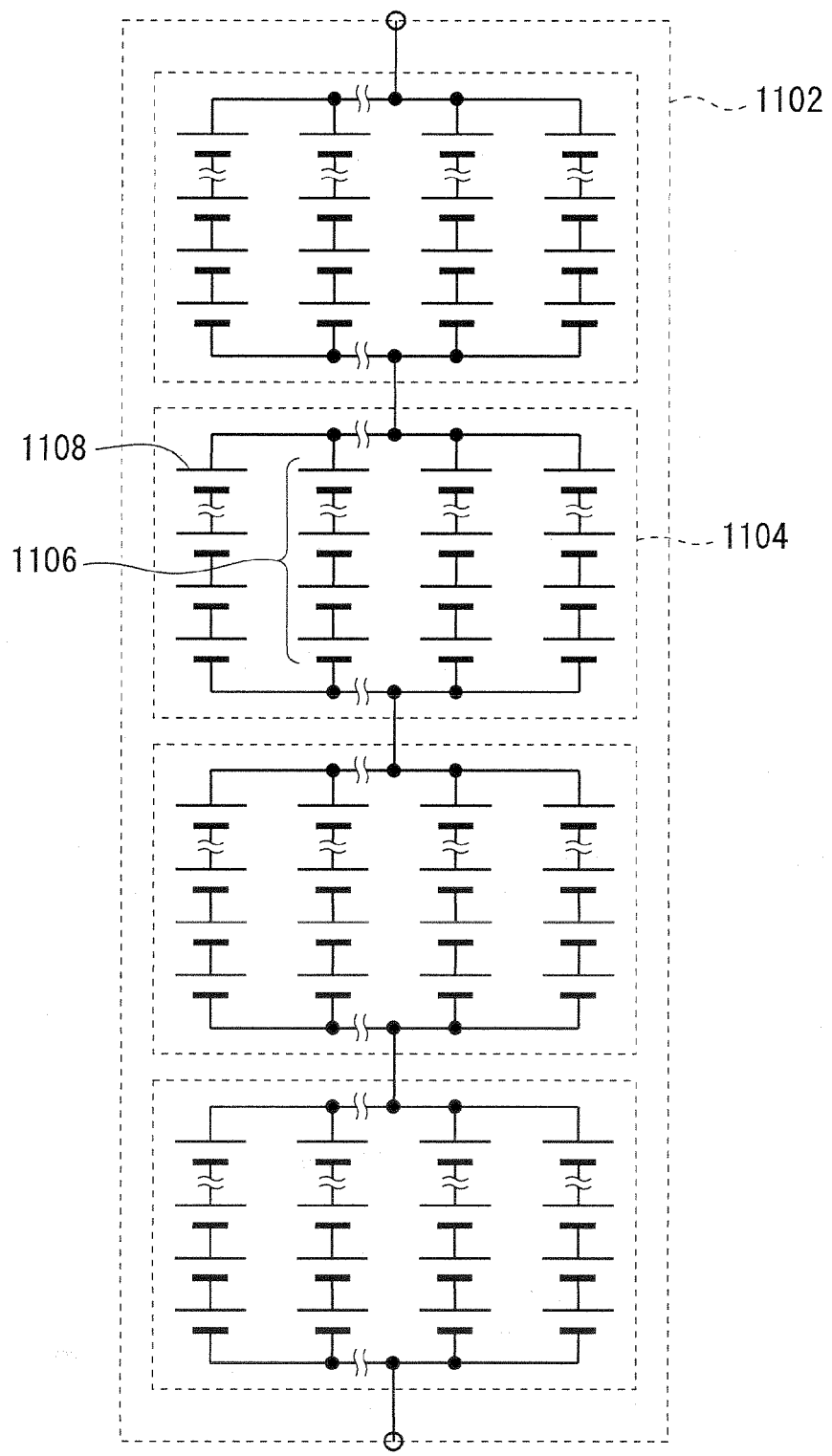
FIG. 6 is a circuit diagram illustrating a module of NaS batteries.

FIG. 6 is a circuit diagram illustrating a module 1102 of the NaS batteries 1004.

As shown in FIG. 6, the module 1102 is a series connecting body in which blocks 1104 are series-connected to each other, and the blocks 1104 are parallel connecting bodies in which strings 1106 are parallel-connected, and the strings 1106 are series connecting bodies in which cells 1108 are series-connected. The number of the blocks 1104 to be series-connected, the number of the strings 1106 to be parallel-connected, and the number of the cells 1108 to be series-connected are increased/decreased according to specifications of the module 1102.

The NaS batteries 1004 have the at least one module 1102. The number of the modules 1102 is increased/decreased according to the specifications of the NaS batteries 1004. A connecting form of cells 1108 in a module 1102 is also changed according to the specifications of the NaS batteries 1004.

(Hall Current Detector 1008)

Each of the Hall current detectors 1008 measures charging/discharging current in each of the plurality of NaS batteries 1004.

Each of Hall current detectors 1008 detects a magnetic field generated by a charging/discharging current via a Hall element, and processes an output from the Hall element by auxiliary circuit such as A/D converter so as to output it. Instead of the Hall current detectors 1008, current detectors having current sensors and necessary auxiliary circuits adopting another principle may be adopted. The charging/discharging power is not directly measured but may be indirectly measured. For example, the charging/discharging power is measured, and measured values of the charging/discharging power may be converted into charging/discharging currents. When the measured values of the charging/discharging power are converted into the charging/discharging currents, for example, AC charging/discharging power is measured on AC sides of the bidirectional converters 1012, and DC charging/discharging voltages are measured on DC sides of the bidirectional converters 1012, so that the charging/discharging currents are calculated based on measured values of the AC charging/discharging power and measured values of the DC charging/discharging voltages.

(Bidirectional Converter 1012)

Each of the bidirectional converters 1012 controls the charging/discharging in each of the plurality of NaS batteries 1004 so that absorbed/emission power becomes a command value.

The bidirectional converters 1012 are called also "PCS (Power Conversion System)" or "AC/DC converters". Mutual conversion between DC and AC in the bidirectional converters 1012 is carried out by PWM (Pulse Width Modulation) inverter or the like.

(Temperature Sensor 1010)

Each of the temperature sensors 1010 measures a temperature in each of the plurality of NaS batteries 1004.

(Outline of Control Part 1016)

FIG. 7 is a block diagram illustrating the control part 1016. Respective functions of the control part 1016 may be realized by making a built-in computer having a CPU and a memory execute control programs, or may be realized by hardware.

As shown in FIG. 7, the control part 1016 includes a discharging capacity calculator 1202 for calculating a discharging capacity of each of the NaS batteries 1004, a DOD calculator 1204 for calculating DOD (depth-of-discharge) of each of the NaS batteries 1004, an SOC calculator 1206 for calculating SOC (state-of-charge) of each of the NaS batteries 1004, an upper limit calculator 1208 for calculating a second upper limit of the emission power for maintaining the temperature of each of the NaS batteries 1004 at the upper limit temperature or less, a order-of-emission-priority giving part 1210 for the preferential virtual batteries for giving an order-of-emission-priority to each of the preferential virtual batteries, a order-of-emission-priority giving part 1212 for the non-preferential virtual batteries for giving an order-of-emission-priority to each of the non-preferential virtual batteries, an order-of-absorption-priority giving part 1214 for giving an order-of-absorption-priority to each of the NaS batteries 1004, an emission power allocating part 1216 for allocating emission power to each of the NaS batteries 1004, an absorbed power allocating part 1218 for allocating absorbed power to each of the NaS batteries 1004, a command value output part 1220 for outputting a command value of emission/absorbed power, and a storage part 1224 for storing information necessary for processes. "To calculate" includes not only calculation according to operation expressions but also processes such as conversion based on a numerical value table and calculation in an analog computing circuit.

(Discharging Capacity Calculator 1202)

The discharging capacity calculator 1202 integrates measured values Im (m=1, 2, 3 and 4; m represents numbers of the NaS batteries 1004) of the charging/discharging current measured by the Hall current detectors 1008, and calculates the discharging capacities of the plurality of NaS batteries 1004.

"To integrate" means a sum total when measuring intervals of the measured values Im are discrete or an integral when the measuring intervals of the measured values Im are non-discrete according to circumstances.

(DOD Calculator 1204)

The DOD calculator 1204 calculates DOD of each of the plurality of NaS batteries 1004 based on a calculated value Cm of the discharging capacity calculated by the discharging capacity calculator 1202 and a rating capacity.

(SOC Calculator 1206)

The SOC calculator 1206 calculates SOC of each of the plurality of NaS batteries 1004 based on the calculated value Cm of the discharging capacity calculated by the discharging capacity calculator 1202 and a rating capacity.

(Upper Limit Calculator 1208)

The upper limit calculator 1208 calculates a second upper limit U2m of the emission power for maintaining the temperature of each of the plurality of NaS batteries 1004 at the upper limit temperature or less based on a measured value Tm of the temperature measured by each of the temperature sensors 1010 and a calculated value DODm of DOD calculated by the DOD calculator 1204.

The second upper limit value U2m is a maximum value of the discharging power for enabling continuous discharging until DOD reaches 100%. As a result, since the emission power for enabling continuous discharging until DOD reaches 100% is first allocated to each of the plurality of NaS batteries 1004, each of the NaS batteries 1004 is easily discharged until DOD reaches 100%.

(Reference Information)

Figure 8:
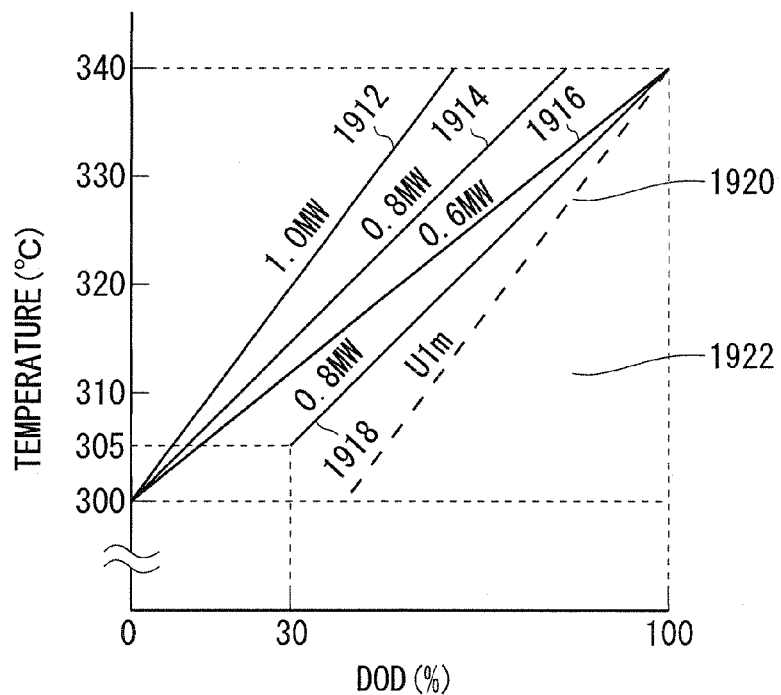
FIG. 8 is a diagram illustrating an example of information where the relationship between DOD and the temperatures of the NaS batteries is described.

FIG. 8 is a diagram illustrating an example of the reference information in which a relationship between DOD and the temperature of each of the NaS batteries 1004 at the time of discharging is described and which is referred to by the upper limit calculator 1208. In FIG. 8, DOD is plotted along an abscissa axis and the temperature is plotted along an ordinate axis, changes in DOD and the temperatures in a case where emission power composed of an effective power component of 1.0 MW, 0.8 MW and 0.6 MW is emitted from an initial state such that DOD is 0% and the temperature is 300° C. are indicated by DOD-temperature characteristic lines 1912, 1914 and 1916, and a change in DOD and the temperature in a case where emission power composed of an effective power component of 0.8 MW is emitted from an initial state such that DOD is 30% and the temperature is 305° C. is indicated by a DOD-temperature characteristic line 1918.

When the upper limit calculator 1208 refers to the reference information in which the relationship between DOD and the temperatures of the NaS batteries 1004 shown in FIG. 8 is described, it is found from the DOD-temperature characteristic line 1916 that for example, when the measured values Tm of the temperatures are 300° C. and calculated values DODm of DOD are 0% and the emission power is set to 0.6 MW or less, the temperatures are maintained at 340° C. or less as the upper limit temperature and thus that the continuous discharging is enabled until DOD reaches 100%, namely, the second upper limit value U2m should be set to 0.6 MW. Further, it is found from the DOD-temperature characteristic line 1918 that when the measured value Tm of the temperature is 305° C. and the calculated value DODm of DOD is 30% and the emission power is set to 0.8 MW or less, the temperature is maintained at 340° C. or less as the upper limit temperature, and thus the continuous discharging is enabled until DOD reaches 100%, namely, the second upper limit value U2m should be set to 0.8 MW.

In general, a DOD-temperature characteristic line from the initial state such that the temperatures are the measured values Tm and DOD is the calculated values DODm to an end state such that the temperatures are the upper limit temperatures or less and DOD is 100% is specified, and emission power for changing the temperatures and DOD of the NaS batteries 1004 along the specified DOD-temperature characteristic line is specified, so that the second upper limit value U2m of the emission power for enabling the continuous discharging while the temperatures are maintained at the upper limit temperatures or less and DOD reaches 100% is specified.

Even when the NaS batteries 1004, whose initial state is included in a scope 1922 where the temperatures are lower than a DOD-temperature characteristic line 1920 that represents changes in temperatures and DOD of the NaS batteries 1004 at a time when the emission power matches with the first upper limit value U1m and that is into the end state such that the temperatures are the upper limit temperatures and DOD is 100%, continuously discharge the emission power matching with the first upper limit value U1m until DOD reaches 100%, the temperatures do not reach the upper limit temperatures. For this reason, the second upper limit value U2m matches with the first upper limit value U1m.

The temperatures of the NaS batteries 1004 are maintained between a lower limit temperature and the upper limit temperature, and DOD of the NaS batteries 1004 is between 0% and 100%.

Due to influences of heat capacities and thermal resistances of the NaS batteries 1004, even when the emission of the electric power from the NaS batteries 1004 is stopped, the rise in the temperatures of the NaS batteries 1004 does not immediately stop, and thus "the upper limit temperature" is desirably set to a value lower than the maximum temperature at which the NaS batteries 1004 normally operate.

Figure 9:
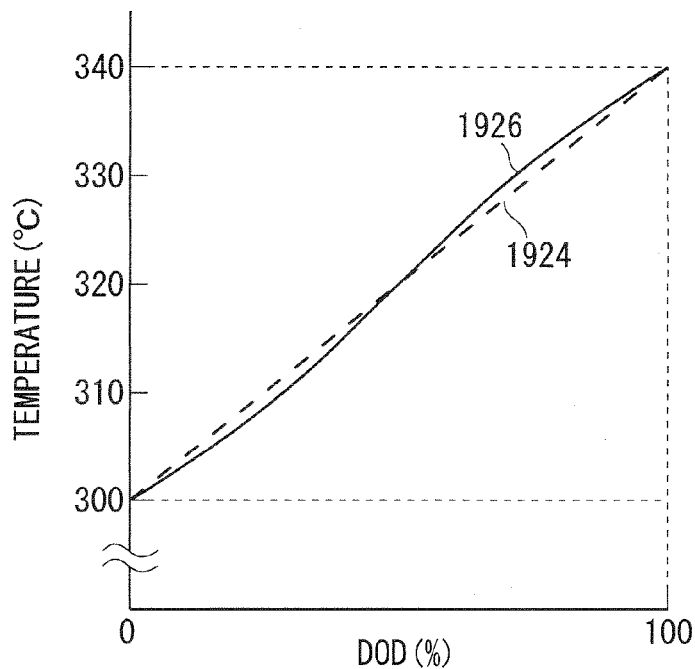
FIG. 9 is a diagram illustrating an example of information where the relationship between DOD and the temperatures of the NaS batteries is described.

As shown in FIG. 9, the second upper limit value U2m having high accuracy is calculated even based on a linear-type DOD-temperature characteristic line 1924 that roughly traces the change states of the NaS batteries 1004, but the second upper limit value U2m having higher accuracy is calculated based on a curved DOD-temperature characteristic line 1926 that definitely traces the change states of the NaS batteries 1004, A DOD-temperature characteristic line 1926 shown in FIG. 9 has an S shape such that a change rate of DOD to the temperature becomes low just after an initial state and just before a terminal state. The change ratio of the temperature to DOD lows just after the initial state due to the influences of the heat capacities and the thermal resistances of the NaS batteries 1004. The change rate of DOD to the temperature becomes low just before the terminal state because after internal resistances of the NaS batteries 1004 become maximum and the change rate of DOD to the temperature becomes high, the NaS batteries 1004 reach the terminal state. The DOD-temperature characteristic line 1928 shown in FIG. 10 has a bow shape such that a change ratio of the temperature to DOD becomes low just after the initial state. The change ratio of the temperature to DOD lows just after the initial state due to the influences of the heat capacities and the thermal resistances of the NaS batteries 1004.

Instead of the maximum value of the discharging power for enabling the continuous discharging until DOD reaches 100%, a maximum value of the emission power for enabling the continuous discharging until a set time passes may be used as the second upper limit value U2m. As a result, since the emission power for enabling continuous discharging until set time passes is first allocated to each of the plurality of NaS batteries 1004, the NaS batteries 1004 are easily discharged until DOD reaches 100%.

(Order-of-Emission-Priority Giving Part 1210 for the Preferential Virtual Batteries)

The order-of-emission-priority giving part 1210 for the preferential virtual batteries gives orders-of-emission-priority to a plurality of the preferential virtual batteries. The order-of-emission-priority giving part 1210 for the preferential virtual batteries raises the order-of-emission-priority with an increasing difference SOCm−SOCt of a calculated value SOCm of SOC in each of the NaS batteries 1004 including the preferential virtual batteries calculated by the SOC calculator 1206 from a target value SOCt. As a result, since the emission power is preferentially allocated to each of the preferential virtual batteries in the NaS batteries 1004 whose SOC greatly exceeds the target value SOCt, SOC is easily brought close to the target value SOCt.

(Order-of-Emission-Priority Giving Part 1212 for the Non-Preferential Virtual Batteries)

The order-of-emission-priority giving part 1212 for the non-preferential virtual batteries gives an order-of-emission-priority to each of the plurality of non-preferential virtual batteries according to an index for giving the orders-of-emission-priority. The index for giving the orders-of-emission-priority desirably includes, as a factor, any one of the followings:

(1) a ratio U2$m$/U1$m$ of the second upper limit U1$m$ of each of the NaS batteries 1004 including the non-preferential virtual batteries calculated by the upper limit calculator 1208 to the first upper limit U1$m$;

(2) a difference Tm–Tt of the measured value Tm of the temperature in each of the NaS batteries 1004 including the non-preferential virtual batteries measured by each of the temperature sensors 1010 from a reference value Tt; and (3) the measured value Tm of the temperature in each of the NaS batteries 1004 including the non-preferential virtual batteries measured by each of the temperature sensors 1010. The index for giving the orders-of-emission-priority may include factors other than the above factors.

When the index for giving the orders-of-emission-priority include the ratio U2$m$/U1$m$ as the factor, the order-of-emission-priority giving part 1212 for the non-preferential virtual batteries raises the order-of-emission-priority with the increasing ratio U2$m$/U1$m$. When the index for giving the orders-of-emission-priority includes the difference Tm–Tt as the factor, the order-of-emission-priority giving part 1212 for the non-preferential virtual batteries raises the order-of-emission-priority with the decreasing difference Tm–Tt. When the index for giving the orders-of-emission-priority includes the measured value Tm of the temperature as the factor, the order-of-emission-priority giving part 1212 for the non-preferential virtual batteries raises the order-of-emission-priority with the decreasing measured value Tm of the temperature. As a result, since the emission power is preferentially allocated to each of the non-preferential virtual batteries in the NaS batteries 1004 whose temperature is unlikely to reach the upper limit temperature, the state that the temperature of each of the NaS batteries 1004 reaches the upper limit temperature is inhibited (Order-of-Absorption-Priority Giving Part 1214)

The order-of-absorption-priority giving part 1214 gives the order-of-absorption-priority to each of the plurality of NaS batteries 1004 according to an index for giving the orders-of-absorption-priority. The index for giving the orders-of-absorption-priority desirably includes, as a factor, any one of the followings:

(1) a ratio U2$m$/U1$m$ of the second upper limit U2$m$ of each of the NaS batteries 1004 including the non-preferential virtual batteries calculated by the upper limit calculator 1208 to the first upper limit U1$m$;

(2) the difference Tm–Tt of the measured value Tm of the temperature of each of the NaS batteries 1004 including the non-preferential virtual batteries measured by each of the temperature sensors 1010 from the reference value Tt; and (3) the measured value Tm of the temperature of each of the NaS batteries 1004 including the non-preferential virtual batteries measured by each of the temperature sensors 1010. The index for giving the orders-of-absorption-priority may includes factors other than the above factors.

When the index for giving the orders-of-absorption-priority includes the ratio U2$m$/U1$m$ as the factor, the order-of-absorption-priority giving part 1214 raises the order-of-absorption-priority with the increasing ratio U2$m$/U1$m$. When the index for giving the orders-of-absorption-priority includes the difference Tm–Tt as the factor, the order-of-absorption-priority giving part 1214 raises the order-of-absorption-priority with the decreasing difference Tm–Tt. When the index for giving the orders-of-absorption-priority includes the measured value Tm of the temperature as the factor, the order-of-absorption-priority giving part 1214 raises the order-of-absorption-priority with the decreasing measured value Tm of the temperature. As a result, since the absorbed power is preferentially allocated to each of the NaS batteries 1004 whose temperature is unlikely to reach the upper limit temperature, the state that the temperature of the NaS batteries 1004 reaches the upper limit temperature is inhibited. The absorbed power is preferentially allocated to each of the NaS batteries 1004 whose temperature is unlikely to reach the upper limit temperature because when the power emission/absorption is repeated, the temperature of each of the NaS batteries 1004 tends to rise. When the NaS batteries 1004 are charged, although an endothermic reaction is caused, the temperature of each of the NaS batteries tends to rise at the time of the repetition of the power emission/absorption because an electric current flows in the internal resistance of each of the NaS batteries 1004 and thus Joule heat is generated.

The index for giving the orders-of-absorption-priority may include:

(4) a difference SOCm–SOCt of the calculated value SOCm of SOC in each of the NaS batteries 1004 calculated by the SOC calculator 1206 from the target value SOCt, as the factor. In this case, the order-of-absorption-priority giving part 1214 raises the order-of-absorption-priority with the decreasing difference SOCm–SOCt. As a result, since the absorbed power is preferentially allocated to each of the NaS batteries 1004 whose SOC falls to well below the target value SOCt, SOC is easily brought close to the target value SOCt.

(Emission Power Allocating Part 1216)

The emission power allocating part 1216 allocates the emission power not more than the first upper limit U1$m$ to each of the plurality of NaS batteries 1004. The emission power allocating part 1216, as described above, allocates the emission power to all the plurality of preferential virtual batteries, and then allocates the emission power to each of the non-preferential virtual batteries. When allocating the emission power to each of the preferential virtual batteries, the emission power allocating part 1216 allocates the emission power to each of the preferential virtual batteries in descending manner of the order-of-emission-priority given by the order-of-emission-priority giving part 1210 for the preferential virtual batteries. When allocating the emission power to each of the non-preferential virtual batteries, the emission power allocating part 1216 allocates the emission power to each of the non-preferential virtual batteries in descending manner of the order-of-emission-priority given by the order-of-emission-priority giving part 1212 for the non-preferential virtual batteries.

The first upper limit U1 is generally determined by the specifications of the NaS batteries 1004 or specifications of connecting lines 1006, the Hall current detectors 1008, the bidirectional converters 1012 and transformers 1014 on routes of the emission power emitted from each of the NaS batteries 1004, but it is mostly ruled by levels of an electric current capable of being applied by each of the bidirectional converters 1012.

(Procedure for Allocating Emission Power)

Figure 11:
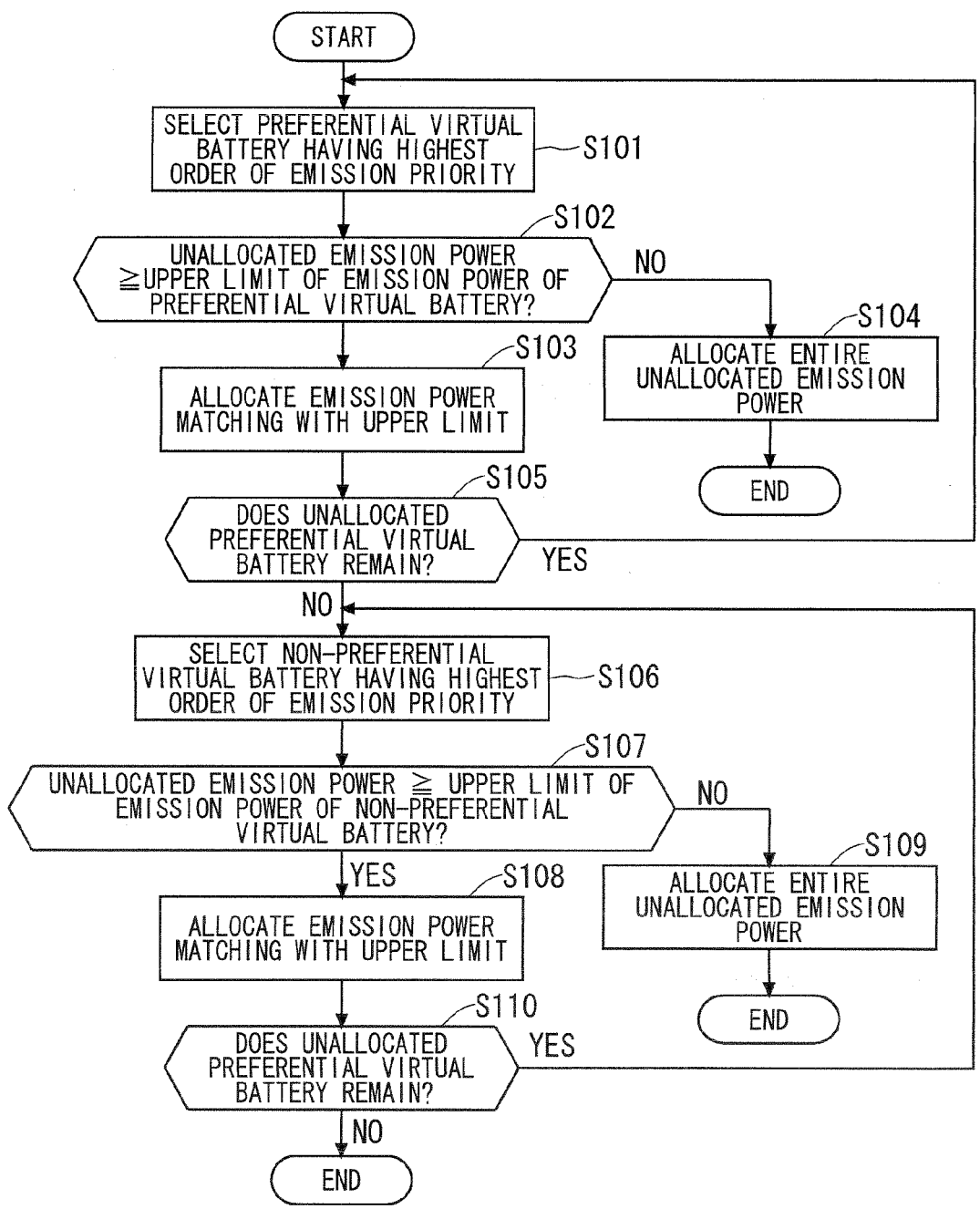
FIG. 11 is a flowchart illustrating a procedure for allocating the emission power to each of NaS batteries.

FIG. 11 is a flowchart illustrating a procedure for allocating the emission power to each of the NaS batteries 1004.

As shown in FIG. 11, when the allocation of the emission power to each of the NaS batteries 1004 is started, the preferential virtual battery having the highest order-of-emission-priority is selected from the preferential virtual batteries to which the emission power is not yet allocated (hereinafter, "unallocated preferential virtual batteries") (step S101).

Thereafter, when emission power that is not yet allocated (hereinafter, "unallocated the emission power") is not less than the upper limit U2$m$ of the emission power of the selected preferential virtual battery ("YES" at step S102), the emission power that matches with the upper limit U2$m$ is allocated to the selected preferential virtual battery (step S103).

On the other hand, when the unallocated emission power is smaller than the upper limit U2$m$ of the emission power of the selected preferential virtual battery ("NO" at step S102), the entire unallocated emission power is allocated to the selected preferential virtual battery (step S104), and the allocation of the emission power is ended.

Thereafter, when the unallocated preferential virtual battery remains ("YES" at step S105), the preferential virtual battery having the highest order-of-emission-priority is selected again from the unallocated preferential virtual batteries (step S101).

On the other hand, when the unallocated preferential virtual battery does not remain ("NO" at step S105), the non-preferential virtual battery having the highest order-of-emission-priority is selected from the non-preferential virtual batteries (hereinafter, "unallocated non-preferential virtual batteries") to each of which the emission power is not allocated (step S106).

Thereafter, when the unallocated emission power is not less than an upper limit U1$m$-U2$m$ of the emission power of the selected non-preferential virtual battery ("YES" at step S107), the emission power that matches with the upper limit U1$m$-U2$m$ is allocated to the selected non-preferential virtual battery (step S108).

On the other hand, when the unallocated emission power is smaller than the upper limit U1$m$-U2$m$ of the emission power of the selected non-preferential virtual battery ("NO" at step S107), the entire unallocated emission power is allocated to the selected non-preferential virtual battery (step S109), and the allocation of the emission power is ended.

Thereafter, when the unallocated non-preferential virtual battery remains ("YES" at step S110), the preferential virtual battery having the highest order-of-emission-priority in the unallocated non-preferential virtual batteries is selected again (step S106).

On the other hand, when the unallocated preferential virtual battery does not remain ("NO" at step S110), the allocation of the emission power is ended.

(Allocation of Effective Power Component and Reactive Power Component)

When the emission power is composed of only the effective power component, the emission power allocating part 1216 allocates the emission power so that an effective power to be allocated to each of the plurality of NaS batteries 1004 becomes the first upper limit U1$m$ or less and an effective power to be allocated to each of the plurality of preferential virtual batteries becomes the second upper limits U2$m$ or less.

Similarly, when the emission power is composed of only a reactive power component, the emission power allocating part 1216 allocates the emission power so that a reactive power to be allocated to each of the plurality of NaS batteries 1004 becomes the first upper limit U1$m$ or less and a reactive power to be allocated to each of the plurality of preferential virtual batteries becomes the second upper limits U2$m$ or less. The reactive power to be allocated to each of the plurality of NaS batteries 1004 may be only set to the first upper limit U1$m$ or less.

Figure 12:
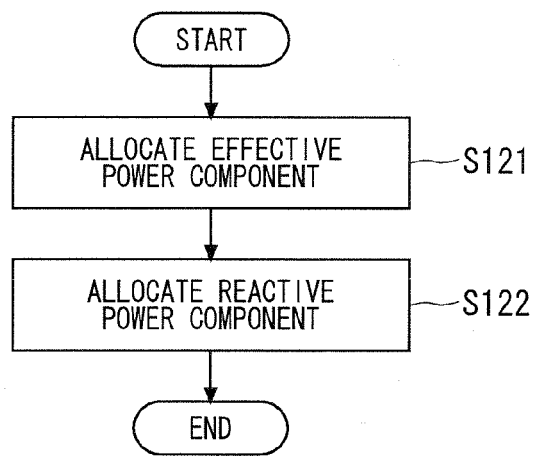
FIG. 12 is a flowchart illustrating a procedure for allocating an effective power component and a reactive power component.

FIG. 12 is a flowchart illustrating a procedure for allocating the effective power component and the reactive power component in a case where the emission power is composed of the effective power component and the reactive power component.

As shown in FIG. 12, when the emission power is composed of the effective power component and the reactive power component, the emission power allocating part 1216 allocates the emission power so that apparent power to be allocated to each of the plurality of NaS batteries 1004 becomes the first upper limit U1$m$ or less and the effective power to be allocated to each of the plurality of preferential virtual batteries becomes the second upper limits U2$m$ or less. Further, after allocating the effective power component, the emission power allocating part 1216 allocates the reactive power component.

The reactive power component is allocated after the effective power component because an effect of the reactive power component on DOD and the temperature of each of the NaS batteries 1004 is smaller than an effect of the effective power component. That is, the effective power component causes deterioration in DOD that corresponds to a total of a loss due to effective power energy and flowing of an electric current in the internal resistance and causes a rise in the temperature according to heat generation due to an exothermic reaction and heat generation due to flowing of the electric current in the internal resistance, whereas the reactive power component causes deterioration in DOD corresponding to a loss due to the flowing of the electric current in the internal resistance and causes only a rise in the temperature corresponding to the heat generation due to the flowing of the electric current in the internal resistance. Further, when the small reactive power component is emitted, the reactive power component is emitted mostly from an inductor, a capacitor or the like included in or connected to each of the bidirectional converters 1012. That is, when the small reactive power component is emitted, the reactive power component is not emitted from each of the NaS batteries 1004 in most cases. In such a manner, after the effective power component is allocated, the reactive power component is allocated so that the effective power component and the reactive power component are suitably allocated. Also when the small reactive power component is absorbed, the reactive power component is absorbed mostly by an inductor, a capacitor or the like included in or connected to each of the bidirectional converters 1012. That is, also when the small reactive power component is absorbed, the reactive power component is not absorbed by each of the NaS batteries 1004 in most cases.

(Absorbed Power Allocating Part 1218)

The absorbed power allocating part 1218 allocates the absorbed power not more than a third upper limit U3$m$ to each of the plurality of NaS batteries 1004. The absorbed power allocating part 1218 allocates the absorbed power to each of the NaS batteries 1004 in descending manner of the order-of-absorption-priority given by the order-of-absorption-priority giving part 1214.

In general, the third upper limit U3 is also determined by the specifications of the NaS batteries 1004 or the specifications of the connecting lines 1006, the Hall current detectors 1008, the bidirectional converters 1012 and the transformers 1014 on the routes of the emission power emitted from each of the NaS batteries 1004, but it is mostly ruled by levels of the electric currents capable of being applied by the bidirectional converters 1012.

(Procedure for Allocating Absorbed Power)

Figure 13:
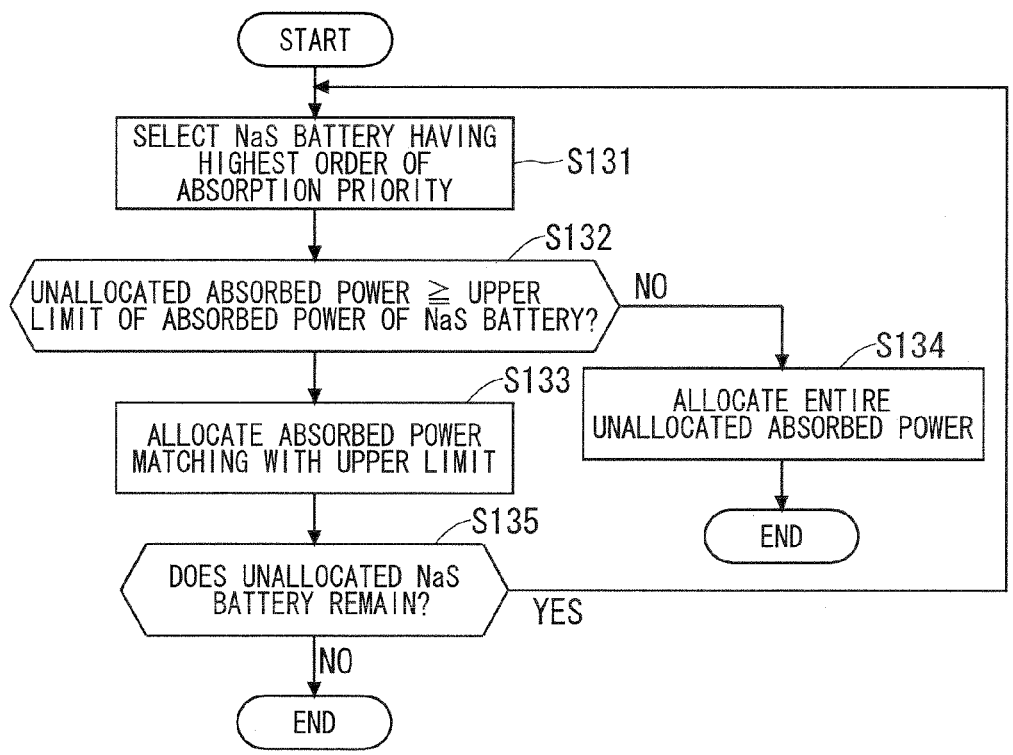
FIG. 13 is a flowchart illustrating a procedure for allocating the absorbed power to each of the NaS batteries.

FIG. 13 is a flowchart illustrating a procedure for allocating the absorbed power to each of the NaS batteries 1004.

As shown in FIG. 13, when the allocation of the absorbed power to each of the NaS batteries 1004 is started, the NaS battery 1004 having the highest order-of-absorption-priority is selected from each of the NaS batteries 1004 to which the absorbed power is not yet allocated (hereinafter, "the unallocated NaS batteries") (step S131).

Thereafter, when the absorbed power that is not yet allocated (hereinafter, "the unallocated absorbed power") is not less than the upper limit U3$m$ of the absorbed power of the selected NaS battery 1004 ("YES" at step S132), the absorbed power that matches with the upper limit U3$m$ is allocated to the selected NaS battery 1004 (step S133).

On the other hand, when the unallocated absorbed power is smaller than the upper limit U3$m$ of the absorbed power of the selected NaS battery 1004 ("NO" at step S132), the entire unallocated absorbed power is allocated to the selected NaS battery 1004 (step S134), and the allocation of the absorbed power is ended.

Thereafter, when the unallocated NaS batteries remain ("YES" at step S135), the NaS battery 1004 having the highest order-of-emission-priority in the unallocated NaS batteries is selected again (step S131).

On the other hand, when the unallocated NaS batteries do not remain ("NO" at step S135), the allocation of the absorbed power is ended.

(Command Value Output Part 1220)

The command value output part 1220 outputs a total of the emission power allocated to each of the preferential virtual batteries and the emission power allocated to each of the non-preferential virtual batteries by the emission power allocating part 1216 as a command value of the emission power to the bidirectional converters 1012. Further, the command value output part 1220 outputs the absorbed power allocated to each of the NaS batteries 1004 by the absorbed power allocating part 1218 as the command value to each of the bidirectional converters 1012.

(Inhibition of Allocation of Emission Power)

The allocation of the emission power to each of the NaS batteries 1004 where the allocation of the emission power should be inhibited may be inhibited regardless of the orders-of-emission-priority. The NaS batteries 1004 where the allocation of the emission power should be inhibited include the NaS batteries 1004 in which the calculated value SOC$m$ of SOC calculated by the SOC calculator 1206 is a threshold or less and thus is close to the discharging end, and the NaS batteries 1004 in which the measured value T$m$ of the temperature measured by each of the temperature sensors 1010 is a threshold or more and thus close to the upper limit temperature.

Figure 14:
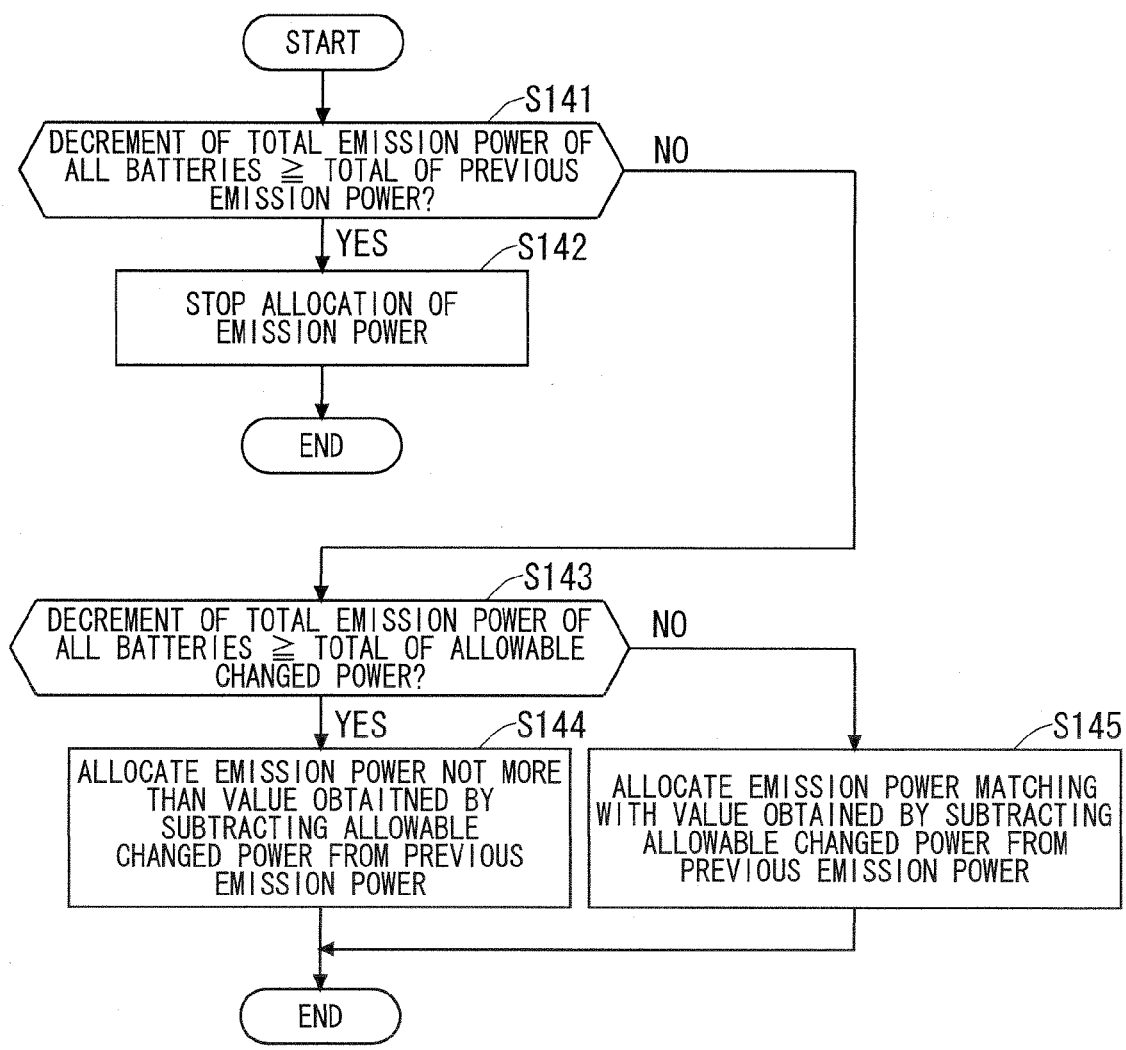
FIG. 14 is a flowchart illustrating a procedure for allocating the emission power to each of the NaS batteries where the allocation of the emission power is not desirable.

FIG. 14 is a flowchart illustrating a procedure for allocating the emission power to each of the NaS batteries 1004 where the allocation of the emission power should be inhibited.

As shown in FIG. 14, when the emission power is allocated to each of the NaS batteries 1004 where the allocation of the emission power should be inhibited (hereinafter, "the NaS batteries subject to discharge inhibition") and a decrement TOPP−TOPC of the set value TOPC of a current total emission power of all the batteries with respect to a set value TOPP of a previous total emission power of all the batteries is not less than a total ΣOPP$m$ of a previous emission power OPP$m$ of the NaS batteries 1004 subject to the emission inhibition ("YES" at step S141), the allocation of the emission power to each of the NaS batteries subject to the emission inhibition is stopped (step S142), and the allocation of the emission power to each of the NaS batteries subject to the emission inhibition is ended.

Further, when the decrement TOPP−TOPC is smaller than the total ΣOPP$m$ ("NO" at step S141) and is not less than a total ΣPCP$m$ of an allowable changed power PCP$m$ of each of the NaS batteries subject to the emission inhibition ("YES" at step S143), the emission power that is not more than a value OPP$m$−PCP$m$ obtained by subtracting the allowable changed power PCP$m$ from the previous emission power OPP$m$ is allocated to each of the NaS batteries subject to the emission inhibition (step S144) in the allocation of the current emission power, and the allocation of the emission power to each of the NaS batteries subject to the emission inhibition is ended. In this case, the total Σ (OPP$m$−OPC$m$) of the value OPP$m$−OPC$m$ obtained by subtracting the current emission power OPC$m$ from the previous emission power OPP$m$ in each of the NaS batteries subject to the emission inhibition is made to match with the decrement TOPP−TOPC.

Further, when the decrement TOPP−TOPC is smaller than the total ΣOPP$m$ ("NO" at step S141) and is smaller than the total ΣPCP$m$ of the allowable changed power PCP$m$ of each of the NaS batteries subject to the emission inhibition ("NO" at step S143), the emission power that matches with a value OPP$m$−PCP$m$ obtained by subtracting the allowable changed power PCP$m$ from the previous emission power OPP$m$ is allocated to each of the NaS batteries subject to the emission inhibition (step S145), and the allocation of the emission power to each of the NaS batteries subject to the emission inhibition is ended.

In such allocation of the emission power to each of the NaS batteries subject to the emission inhibition, since the decrement of the emission power allocated to each of the NaS batteries subject to the emission inhibition is the allowable changed power PCP$m$ or more, the emission power is sufficiently inhibited.

After the allocation of the emission power to each of the NaS batteries subject to the emission inhibition is ended, the emission power is allocated to each of the NaS batteries 1004 other than NaS batteries subject to the emission inhibition according to a procedure shown in FIG. 11. As a result, the decrement of the set value TOPC of the current total emission power of all the batteries with respect to the set value TOPP of the previous total emission power of all the batteries is preferentially utilized for reducing the allocation of the emission power to each of the NaS batteries 1004 where the allocation of the emission power should be inhibited.

(Inhibition of Allocation of Absorbed Power)

Similarly, the allocation of the absorbed power to each of the NaS batteries 1004 where the allocation of the absorbed power should be inhibited may be inhibited regardless of the orders-of-absorption-priority. The NaS batteries 1004 where the allocation of the absorbed power should be inhibited include the NaS batteries 1004 where the calculated value SOC$m$ of SOC calculated by the SOC calculator 1206 is a threshold or more and thus is close to a charging end.

Figure 15:
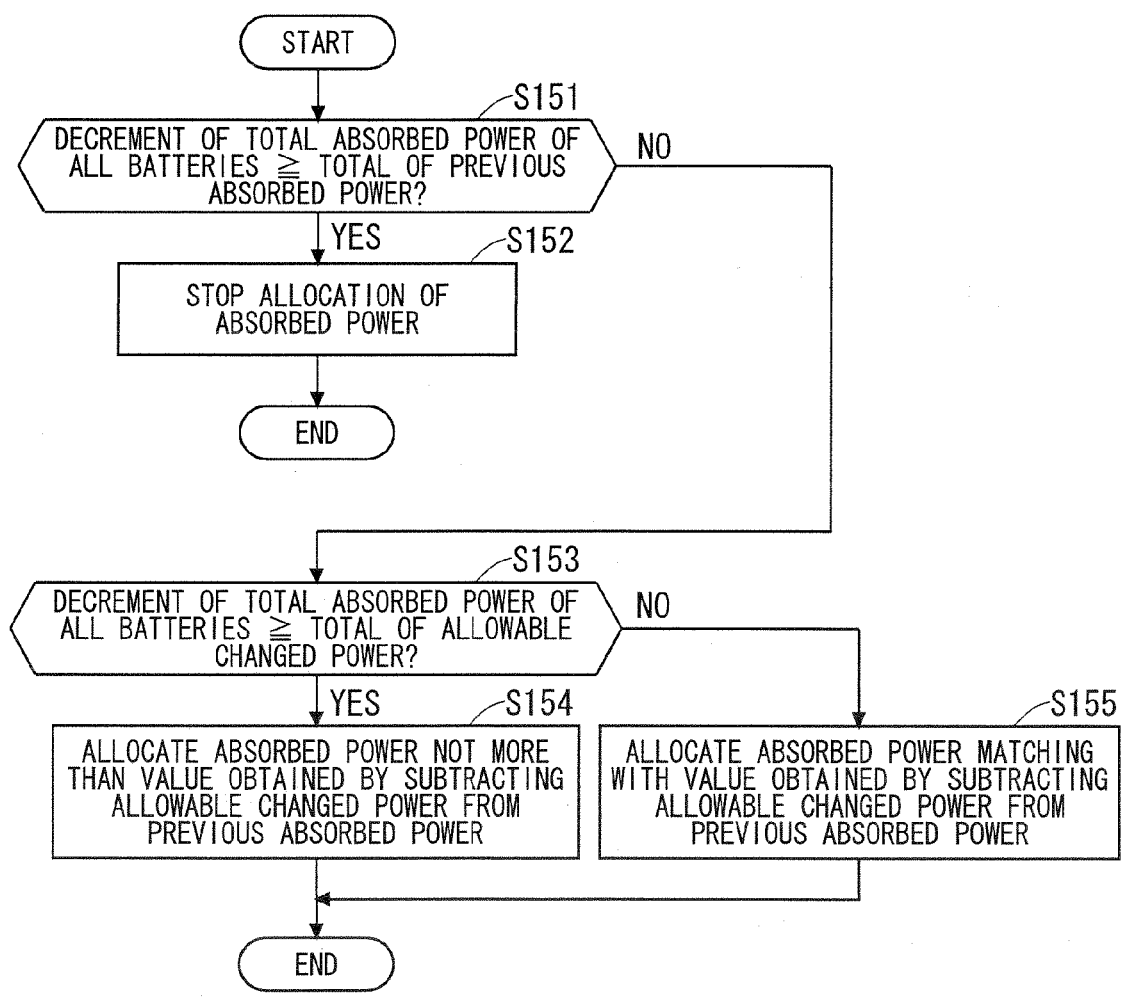
FIG. 15 is a flowchart illustrating a procedure for allocating the absorbed power to the NaS batteries where the allocation of the absorbed power is not desirable.

FIG. 15 is a flowchart illustrating a procedure for allocating the absorbed power to each of the NaS batteries 1004 where the allocation of the absorbed power should be inhibited.

As shown in FIG. 15, when the absorbed power is allocated to each of the NaS batteries 1004 where the allocation of the absorbed power should be inhibited (hereinafter, "the NaS batteries subject to absorption inhibition") and a decrement TIPP−TIPC of the set value TIPC of the current total absorbed power of all the batteries with respect to the set value TIPP of the previous total absorbed power of all the batteries is not less than a total ΣIPP$m$ of the previous emission power IPP$m$ of each of the NaS batteries 1004 subject to the emission inhibition ("YES" at step S151), the allocation of the absorbed power to each of the NaS batteries subject to the absorption inhibition is stopped (step S152), and the allocation of the absorbed power to each of the NaS batteries subject to the absorption inhibition is ended.

Further, when the decrement TIPP−TIPC is smaller than the total ΣIPPm ("NO" at step S151) and is not less than the total ΣPCPm of the allowable changed power PCPm of the NaS batteries 1004 subject to the absorption inhibition ("YES" at step S153), the absorbed power that is not more than a value IPPm−PCPm obtained by subtracting the allowable changed power PCPm from the previous absorbed power IPPm is allocated to each of the NaS batteries subject to the absorption inhibition (step S154), and the allocation of the absorbed power to each of the NaS batteries subject to the absorption inhibition is ended. In this case, a total E (IPPm−IPCm) of a value IPPm−IPCm obtained by subtracting the current absorbed power IPCm from the previous absorbed power IPPm of each of the NaS batteries subject to the absorption inhibition is made to match with the decrement TOPP−TOPC.

Further, when the decrement TOPP−TOPC is smaller than the total ΣOPPm ("NO" at step S151) and further smaller than the total ΣPCP of the allowable changed power PCPm of each of the NaS batteries 1004 subject to the absorption inhibition ("NO" at step S153), the absorbed power that matches with a value OPPm−PCPm obtained by subtracting the allowable changed power PCPm from the previous absorbed power OPPm is allocated to each of the NaS batteries subject to the absorption inhibition (step S145) in the allocation of the current absorbed power, and the allocation of the absorbed power to each of the NaS batteries subject to the absorption inhibition is ended.

In such allocation of the absorbed power to each of the NaS batteries subject to the absorption inhibition, since the decrement of the absorbed power to be allocated to each of the NaS batteries subject to the absorption inhibition is the allowable changed power PCPm or more, the absorbed power is sufficiently inhibited.

After the allocation of the absorbed power to each of the NaS batteries subject to the absorption inhibition is ended, the absorbed power is allocated to each of the NaS batteries 1004 other than the NaS batteries subject to the absorption inhibition according to the procedure shown in FIG. 11. A reduction in the set value TIPC of the current total absorbed power of all the batteries with respect to the set value TIPP of the previous total absorbed power of all the batteries is preferentially utilized for reducing the allocation of the absorbed power to each of the NaS batteries 1004 where the allocation of the absorbed power should be inhibited.

(Operation of Power Storage Facility 1002 and Target Value SOCt of SOC)

The form of the operation of the power storage facility 1002 is roughly divided into a pattern operation and a power smoothing operation.

The pattern operation is an operation for absorbing/emitting electric power according to a fluctuation in a daily power demand. For example, the pattern operation is generally performed in a manner that absorption of electric power is carried out during the night at which the power demand is low, and emission of the electric power is carried out during the day where the power demand is high. When the pattern operation is performed, hourly total absorbed/emission power of all the batteries is mostly set in advance.

The power smoothing operation is an operation for charging/discharging according to a fluctuation in a shorter power demand. When the power storage facility 1002 performs the power smoothing operation, the target value SOCt of SOC is mostly set to about 50%.

In both the pattern operation and the power smoothing operation, when the calculated values of the discharging capacities in the NaS batteries 1004 are corrected at the charging end, the target value SOCt of SOC is temporarily set to about 100%, and when the calculated values of the discharging capacities in the NaS batteries 1004 are corrected at the discharging end, the target value SOCt is temporarily set to about 0%.

(Manual Operation of Power Storage Facility 1002)

The absorbed/emission power may be manually allocated to each of the plurality of NaS batteries 1004.

In order to enable manual allocation of the absorbed/emission power, the power storage facility 1002 displays the first upper limit U1m, the second upper limits U2m, the orders-of-absorption-priority, the orders-of-emission-priority and the like on a display part 1115, and an input of the allocation of the absorbed/emission power is accepted by an operating part 1020. The absorbed/emission power whose input is accepted by the operating part 1020 is transmitted to the command value output part 1220.

Second Embodiment

Outline

A second embodiment relates to allocation of the emission power to each of the preferential virtual batteries that is adopted instead of the allocation of the emission power to each of the preferential virtual batteries in the first embodiment.

In the first embodiment, the order-of-emission-priority is given to each of the plurality of preferential virtual batteries according to the difference SOCm−SOCt, but in the second embodiment, an emission-priority-degree-segment to which each of the plurality of preferential virtual batteries belongs is determined according to the difference SOCm−SOCt, and intra-segment-orders-of-emission-priority are given to the preferential virtual batteries belonging to the same emission-priority-degree-segment according to an index for giving the intra-segment-orders-of-emission-priority that is different from the difference SOCm−SOCt.

Figure 16:
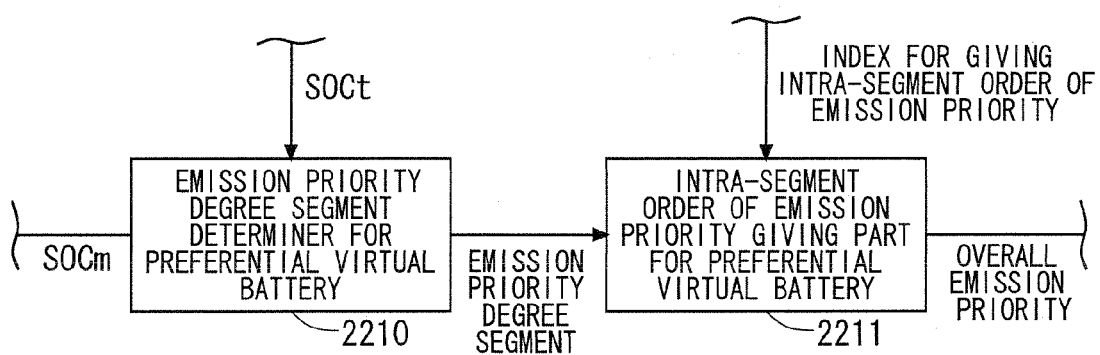
FIG. 16 is a block diagram describing the allocation of emission power to preferential virtual batteries according to a second embodiment.

FIG. 16 is a block diagram describing the allocation of the emission power to each of the preferential virtual batteries according to the second embodiment.

As shown in FIG. 16, in the second embodiment, instead of the order-of-emission-priority giving part 1210 for the preferential virtual batteries in the first embodiment, an emission-priority-degree-segment determiner 2210 for the preferential virtual batteries and an intra-segment-order-of-emission-priority giving part 2211 for the preferential virtual batteries are provided.

(Emission-Priority-Degree-Segment)

The emission-priority-degree-segment determiner 2210 for the preferential virtual batteries carries out stratification on the plurality of preferential virtual batteries, and determines the emission-priority-degree-segment to which each of the plurality of preferential virtual batteries belongs. The emission-priority-degree-segment determiner 2210 for the preferential virtual batteries raises the emission-priority-degree-segments with the increasing difference SOCm−SOCt of the calculated value SOCm of SOC in each of the NaS batteries 1004 including the preferential virtual batteries calculated by the SOC calculator 1206 from the target value SOCt. As a result, since the emission power is preferentially allocated to each of the preferential virtual batteries of the NaS batteries 1004 whose SOC greatly exceeds the target value, SOC is easily brought close to the target values SOCt.

Figure 17:
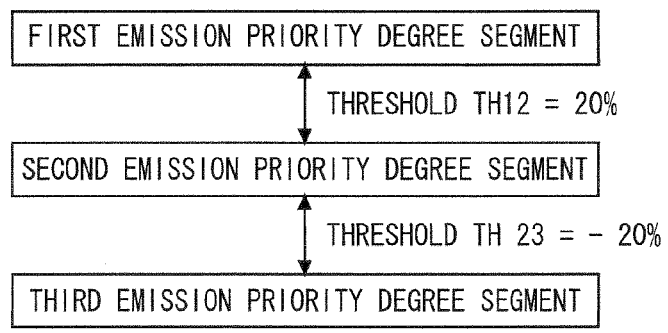
FIG. 17 is a diagram describing discharging-priority-degree-segments.

The plurality of emission-priority-degree-segments are divided by a threshold of the difference SOCm−SOCt. For example, when the three emission-priority-degree-segments are present, as shown in FIG. 17, a threshold TH12 for separating a first emission-priority-degree-segment and a second emission-priority-degree-segment is 20%, and a threshold TH23 for separating the second emission-priority-degree-segment and a third emission-priority-degree-segment is −20%. In this case, the NaS batteries 1004 where SOCm−SOCt≥20% belong to the first emission-priority-degree-segment, the NaS batteries 1004 where 20%≥SOCm−SOCt≥−20% belong to the second emission-priority-degree-segment, and the NaS batteries 1004 where −20%≥SOCm−SOCt belong to the third emission-priority-degree-segment.

As a result, since even if the difference SOCm−SOCt slightly changes, mostly the belonging emission-priority-degree-segments do not change, a great change in the allocation of the emission power due to the slight change in the difference SOCm−SOCt is inhibited. Further, since the index for giving the intra-segment-orders-of-emission-priority that is different from the difference SOCm−SOCt is reflected to the allocation of the emission power, the emission power is allocated more suitably.

(Intra-Segment-Order-of-Emission-Priority)

The intra-segment-order-of-emission-priority giving part 2211 for the preferential virtual batteries gives the intra-segment-order-of-emission-priority to each of the preferential virtual batteries in each of the emission-priority-degree-segments according to the index for giving the intra-segment-orders-of-emission-priority. The index for giving the intra-segment-orders-of-emission-priority desirably includes, as the factor, any one of the followings:

(1) the ratio U$2m$/U$1m$ of the second upper limit U$2m$ of each of the NaS batteries 1004 including the preferential virtual batteries calculated by the upper limit calculator 1208 to the first upper limit U$1m$;

(2) the difference Tm−Tt of the measured value Tm of the temperature of each of the NaS batteries 1004 including the preferential virtual batteries measured by each of the temperature sensors 1010 from the reference value Tt; and (3) the measured values Tm of the temperature of each of the NaS batteries 1004 measured by each of the temperature sensors 1010.

When the index for giving the intra-segment-orders-of-emission-priority includes the ratio U$2m$/U$1m$ as the factor, the intra-segment-order-of-emission-priority giving part 2211 for the preferential virtual batteries raises the intra-segment-orders-of-emission-priority with the increasing ratio U$2m$/U$1m$. When the index for giving the intra-segment-orders-of-emission-priority includes the difference Tm−Tt as the factor, the intra-segment-order-of-emission-priority giving part 2211 for the preferential virtual batteries raises the intra-segment-orders-of-emission-priority with the decreasing difference Tm−Tt. When the index for giving the intra-segment-orders-of-emission-priority includes the measured value Tm of the temperature as the factor, the intra-segment-order-of-emission-priority giving part 2211 for preferential virtual batteries raises the intra-segment-orders-of-emission-priority with the decreasing measured value Tm of the temperature. As a result, since the emission power is preferentially allocated to each of the NaS batteries 1004 whose temperature is unlikely to reach the upper limit temperature, the state that the temperature of each of the NaS batteries 1004 reaches the upper limit temperature is inhibited.

(Overall Priority)

Overall order-of-emission-priority given to each of the plurality of preferential virtual batteries is output to the emission power allocating part 1216 so that the emission power is allocated to each of the preferential virtual batteries in descending manner of the belonging emission-priority-degree-segment, and the emission power is allocated to each of the preferential virtual batteries belonging to the same emission-priority-degree-segment in descending manner of the intra-segment-order-of-priority.

Third Embodiment

Outline

A third embodiment relates to allocation of the emission power to each of the non-preferential virtual batteries that is adopted instead of the allocation of the emission power to each of the non-preferential virtual batteries in the first embodiment.

In the first embodiment, the order-of-emission-priority is given to each of the plurality of non-preferential virtual batteries according to the index for giving the orders-of-emission-priority, but in the third embodiment, the emission-priority-degree-segment to which each of the plurality of non-preferential virtual batteries belongs is determined according to an index for determining the emission-priority-degree-segments, and the intra-segment-orders-of-emission-priority are given to the non-preferential virtual batteries belonging to the same emission-priority-degree-segment according to the index for giving the intra-segment-orders-of-emission-priority different from the index for determining the emission-priority-degree-segments.

Figures 18, 19:
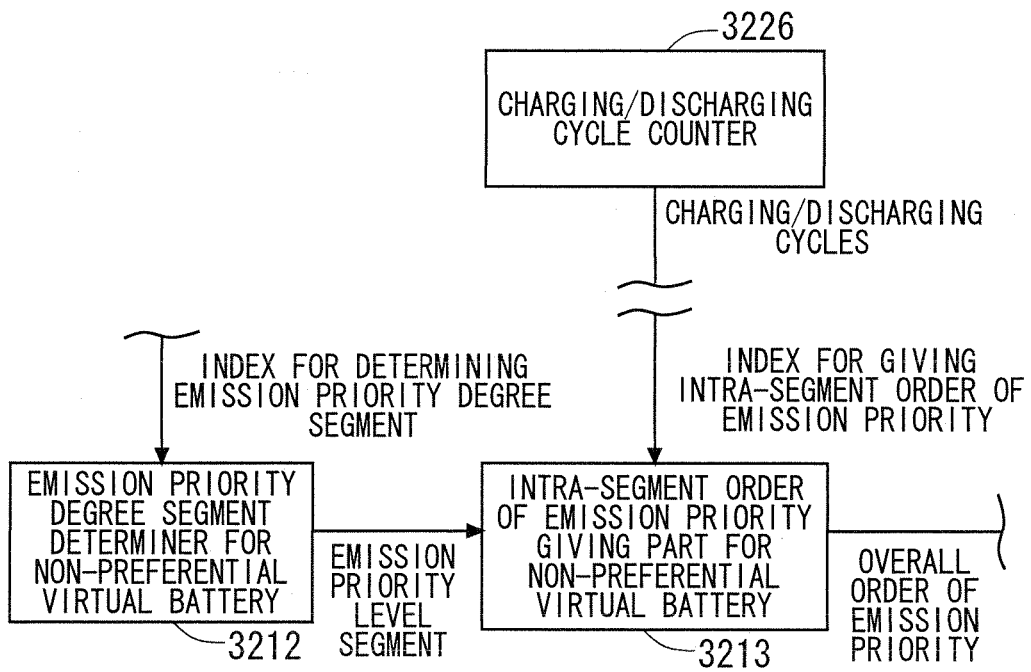
FIG. 18 is a block diagram describing allocation of the emission power to the non-preferential virtual batteries according to a third embodiment.
FIG. 19 is a diagram describing cyclic shuffling of the intra-segment-orders-of-emission-priority.

FIG. 18 is a block diagram describing allocation of the emission power to each of the non-preferential virtual batteries in the third embodiment.

As shown in FIG. 18, in the third embodiment, instead of the order-of-emission-priority giving part 1212 for the non-preferential virtual batteries in the first embodiment, an emission-priority-degree-segment determiner 3212 for the non-preferential virtual batteries, an intra-segment-order-of-emission-priority giving part 3213 for the non-preferential batteries, and a charging/discharging cycle counter 3226 are provided.

(Determination of Emission-Priority-Degree-Segments)

The emission-priority-degree-segment determiner 3212 for the non-preferential virtual batteries carries out stratification on the plurality of non-preferential virtual batteries and determines the emission-priority-degree-segment to which each of the plurality of non-preferential virtual batteries belongs according to the index for determining the emission-priority-degree-segments. The index for determining the emission-priority-degree-segments desirably includes, as the factor, any one of the followings:

(1) the ratio U$2m$/U$1m$ of the second upper limit U$1m$ of each of the NaS batteries 1004 including the non-preferential virtual batteries calculated by the upper limit calculator 1208 to the first upper limit U$1m$;

(2) the difference Tm−Tt of the measured value Tm of the temperature of each of the NaS batteries 1004 including the non-preferential virtual batteries measured by each of the temperature sensors 1010 from the reference value Tt; and (3) the measured value Tm of the temperature of each of the NaS batteries 1004 including the non-preferential virtual batteries measured by each of the temperature sensors. The index for determining the emission-priority-degree-segments may include factors other than the above factors.

When the index for determining the emission-priority-degree-segments includes the ratio $U2m/U1m$ as the factor, the emission-priority-degree-segment determiner 3212 for the non-preferential virtual batteries raises the emission-priority-degree-segments with the increasing ratio $U2m/U1m$. When the index for determining the emission-priority-degree-segments includes the difference $Tm-Tt$ as the factor, the emission-priority-degree-segment determiner 3212 for the non-preferential virtual batteries raises the emission-priority-degree-segments with the decreasing difference $Tm-Tt$. When the index for determining the emission-priority-degree-segments includes the measured value $Tm$ of the temperature as the factor, the emission-priority-degree-segment determiner 3212 for the non-preferential virtual batteries raises the emission-priority-degree-segments with the decreasing measured value $Tm$ of the temperature. As a result, since the emission power is preferentially allocated to each of the non-preferential virtual batteries in the NaS batteries 1004 whose temperature is unlikely to reach the upper limit temperature, the state that the temperature of each of the NaS batteries 1004 reaches the upper limit temperature is inhibited.

The plurality of emission-priority-degree-segments are divided by a threshold of the index for determining the emission-priority-degree-segments.

As a result, since even if the index for determining the emission-priority-degree-segments slightly changes, mostly the belonging emission-priority-degree-segments do not change, a great change in the allocation of the emission power due to the slight change in the index for determining the emission-priority-degree-segments is inhibited.

(Giving of Intra-Segment-Orders-of-Emission-Priority)

The intra-segment-order-of-emission-priority giving part 3213 for the non-preferential batteries gives the intra-segment-order-of-emission-priority to each of the non-preferential virtual batteries in each of the emission-priority-degree-segments according to an index for giving the intra-segment-orders-of emission-priority. The index for giving the intra-segment-orders-of-emission-priority desirably includes the number of charging/discharging cycles of the NaS batteries 1004 including the non-preferential virtual batteries counted by the charging/discharging cycle counter 3226 as the factor. In this case, the intra-segment-order-of-emission-priority giving part 3213 for the non-preferential batteries raises the intra-segment-orders-of-emission-priority with the decreasing the number of charging/discharging cycles. As a result, since the emission power is preferentially allocated to each of the non-preferential virtual batteries in the NaS batteries 1004 whose number of charging/discharging cycles is small, the number of the charging/discharging cycles of each of the NaS batteries 1004 is uniformed.

The intra-segment-order-of-emission-priority giving part 3213 for the non-preferential virtual batteries may cyclically shuffle the intra-segment-orders-of-emission-priority over time regardless of the index for giving the intra-segment-orders-of-emission-priority. As a result, since the intra-segment-orders-of-emission-priority are cyclically shuffled, the number of the charging/discharging cycles of each of the NaS batteries 1004 is uniformed. In this case, the charging/discharging cycle counter 3226 is not necessary.

FIG. 19 is a diagram describing an example of cyclic shuffling of the intra-segment-orders-of-emission-priority. FIG. 19 illustrates the intra-segment-orders-of emission-priority of the non-preferential virtual batteries A2, B2, C2 and D2 when time T1, T2, T3, T4, . . . passes.

(Overall Orders-of-Emission-Priority)

The overall order-of-emission-priority given to each of the plurality of non-preferential virtual batteries is output to the emission power allocating part 1216 so that the emission power is allocated to each of the non-preferential virtual batteries in descending manner of the belonging emission-priority-degree-segment, and the emission power is allocated to each of the non-preferential virtual batteries belonging to the same emission-priority-degree-segment in descending manner of the intra-segment-order-of-priority.

Fourth Embodiment

Outline

A fourth embodiment relates to allocation of the absorbed power to each of the NaS batteries 1004 that is adopted instead of the allocation of the absorbed power to each of the NaS batteries 1004 in the first embodiment.

In the first embodiment, the order-of-absorption-priority is given to each of the plurality of NaS batteries 1004 according to the index for giving the orders-of-absorption-priority, but in the fourth embodiment, the absorption-priority-degree-segment to which each of the plurality of NaS batteries 1004 belongs is determined according to an index for determining the absorption-priority-degree-segments, and the intra-segment-orders-of-absorption-priority are given to the NaS batteries 1004 belong to the same absorption-priority-degree-segment according to an index for determining the intra-segment-orders-of-absorption-priority different from the index for determining the absorption-priority-degree-segments.

Figures 20, 21:
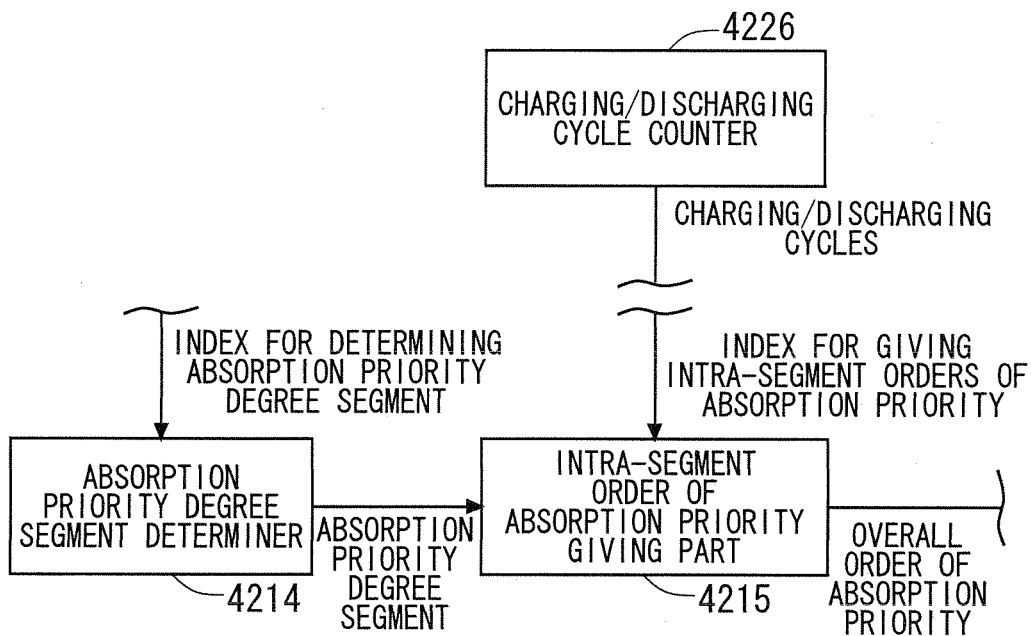
FIG. 20 is a block diagram describing the allocation of the absorbed power to NaS batteries according to a fourth embodiment.
FIG. 21 is a diagram describing reference information according to a fifth embodiment.

FIG. 20 is a block diagram describing the allocation of the absorbed power to each of the NaS batteries 1004 in the fourth embodiment.

As shown in FIG. 20, in the fourth embodiment, instead of the order-of-absorption-priority giving part 1214 in the first embodiment, an absorption-priority-degree-segment determiner 4214, an intra-segment-order-of-absorption-priority giving part 4215, and a charging/discharging cycle counter 4226 are provided.

(Determination of Absorption-Priority-Degree-Segments)

The absorption-priority-degree-segment determiner 4214 carries out stratification on the plurality of NaS batteries 1004 and determines the absorption-priority-degree-segment to which each of the plurality of NaS batteries 1004 belongs according to an index for determining the absorption-priority-degree-segments. The index for determining the absorption-priority-degree-segments desirably includes, as the factor, any one of the followings:

(1) the ratio $U2m/U1m$ of the second upper limit $U2m$ calculated by the upper limit calculator 1208 to the first upper limit $U1m$;

(2) the difference $Tm-Tt$ of the measured value $Tm$ of the temperature of each of the NaS batteries 1004 measured by each of the temperature sensors 1010 from the reference value $Tt$; and (3) the measured value $Tm$ of the temperature of each of the NaS batteries 1004 measured by each of the temperature sensors 1010. The index for determining the absorption-priority-degree-segments may include factors other than the above factors.

When the index for determining the absorption-priority-degree-segments includes the ratio $U2m/U1m$ as the factor, the absorption-priority-degree-segment determiner 4214 raises the absorption-priority-degree-segments with the increasing ratio $U2m/U1m$. When the index for determining the absorption-priority-degree-segments includes the difference Tm−Tt as the factor, the absorption-priority-degree-segment determiner 4214 raises the absorption-priority-degree-segments with the decreasing difference Tm−Tt. When the index for determining the absorption-priority-degree-segments includes the measured value Tm of the temperature as the factor, the absorption-priority-degree-segment determiner 4214 raises the absorption-priority-degree-segments with the decreasing the measured value Tm of the temperature. As a result, since the absorbed power is preferentially allocated to each of the NaS batteries 1004 whose temperature is unlikely to reach the upper limit temperature, the state that the temperature of the NaS batteries 1004 reaches the upper limit temperature is inhibited.

The index for determining the absorption-priority-degree-segments may include: (4) a difference SOCm−SOC of the calculated value SOCm of SOC in each of the NaS batteries 1004 calculated by the SOC calculator 1206 from the target value SOCt, as the factor. In this case, the absorption-priority-degree-segment determiner 4214 raises the absorption-priority-degree-segments with the decreasing difference SOCm−SOCt. As a result, since the absorbed power is preferentially allocated to each of the NaS batteries 1004 whose SOC falls to well below the target value SOCt, SOC is easily brought close to the target value SOCt.

The plurality of absorption-priority-degree-segments are divided by a threshold of the index for determining the absorption-priority-degree-segments.

As a result, even if the index for determining the absorption-priority-degree-segments slightly changes, the belonging absorption-priority-degree-segments do not mostly change, a great change in the allocation of the absorbed power due to the slight change in the index for determining the absorption-priority-degree-segments is inhibited.

(Giving of Intra-Segment-Orders-of-Absorption-Priority)

The intra-segment-order-of-absorption-priority giving part 4215 gives the intra-segment-order-of-absorption-priority to each of the NaS batteries 1004 in each of the absorption-priority-degree-segments according to an index for giving the intra-segment-orders-of-absorption-priority. The index for giving the intra-segment-orders-of-absorption-priority desirably includes the number of the charging/discharging cycles counted by the charging/discharging cycle counter 4226 of the NaS batteries 1004 as the factor. In this case, the intra-segment-order-of-absorption-priority giving part 4215 raises the intra-segment-orders-of-absorption-priority with the decreasing the number of charging/discharging cycles. As a result, since the absorbed power is preferentially allocated to each of the NaS batteries 1004 whose number of charging/discharging cycles is small, the number of the charging/discharging cycles of each of the NaS batteries 1004 is uniformed.

The intra-segment-order-of-absorption-priority giving part 4215 may cyclically shuffle the intra-segment-orders-of-emission-priority over time regardless of the index for giving the intra-segment-orders-of-absorption-priority. As a result, since the intra-segment-orders-of-emission-priority are cyclically shuffled, the number of the charging/discharging cycles of each of the NaS batteries 1004 is uniformed. In this case, the charging/discharging cycle counter 4226 is not necessary.

When the index for determining the absorption-priority-degree-segments is the difference SOCm−SOCt, the index for giving the intra-segment-orders-of-absorption-priority may include, as the factor, any one of the followings:

(1) the ratio U2m/U1m of the second upper limit U2m of each of the NaS batteries 1004 calculated by the upper limit calculator 1208 to the first upper limit U1m;

(2) the difference Tm−Tt of the measured value Tm of the temperature of each of the NaS batteries 1004 counted by each of the temperature sensors 1010 from the reference value Tt; and (3) the measured value Tm of the temperature of each of the NaS batteries 1004 measured by each of the temperature sensors 1010.

When the index for giving the intra-segment-orders-of-absorption-priority includes the ratio U2m/U1m as the factor, the intra-segment-order-of-absorption-priority giving part 4215 raises the intra-segment-orders-of-absorption-priority with the increasing ratio U2m/U1m. When the index for giving the intra-segment-orders-of-absorption-priority includes the difference Tm−Tt as the factor, the intra-segment-order-of-absorption-priority giving part 4215 raises the intra-segment-orders-of-absorption-priority with the decreasing Tm−Tt. When the index for giving the intra-segment-orders-of-absorption-priority includes the measured value Tm of the temperature as the factor, the intra-segment-order-of-absorption-priority giving part 4215 raises the intra-segment-orders-of-absorption-priority with the decreasing measured value Tm of the temperature. As a result, since the absorbed power is preferentially allocated to each of the NaS batteries 1004 whose temperature is unlikely to reach the upper limit temperature, the state that the temperature of the NaS batteries 1004 reaches the upper limit temperature is inhibited.

(Overall Order-of-Priority)

Overall order-of-absorption-priority given to each of the plurality of NaS batteries 1004 is output to the emission power allocating part 1216 so that the absorbed power is allocated to each of the NaS batteries 1004 in descending manner of the belonging absorption-priority-degree-segment, and the absorbed power is allocated to each of the NaS batteries 1004 belonging to the same absorption-priority-degree-segment in descending manner of the intra-segment-order-of-absorption-priority.

Fifth Embodiment

A fifth embodiment relates to reference information that is adopted instead of the reference information in the first embodiment.

FIG. 21 is a diagram describing the reference information in the fifth embodiment.

As shown in FIG. 21, the reference information in the fifth embodiment is information in which a relationship between DOD and the temperature of each of the NaS batteries 1004 and the second upper limit is described. According to the reference information in the fifth embodiment, the upper limit calculator 1208 specifies the second upper limit U2m corresponding to the measured value Tm of the temperature measured by each of the temperature sensors 1010 and the calculated value DODm of DOD calculated by the DOD calculator 1204 with reference to the reference information in each of the plurality of NaS batteries 1004.

Sixth Embodiment

A sixth embodiment relates to correction of the reference information that is desirably made by the power storage facility 1002 in the first embodiment.

Figure 22:
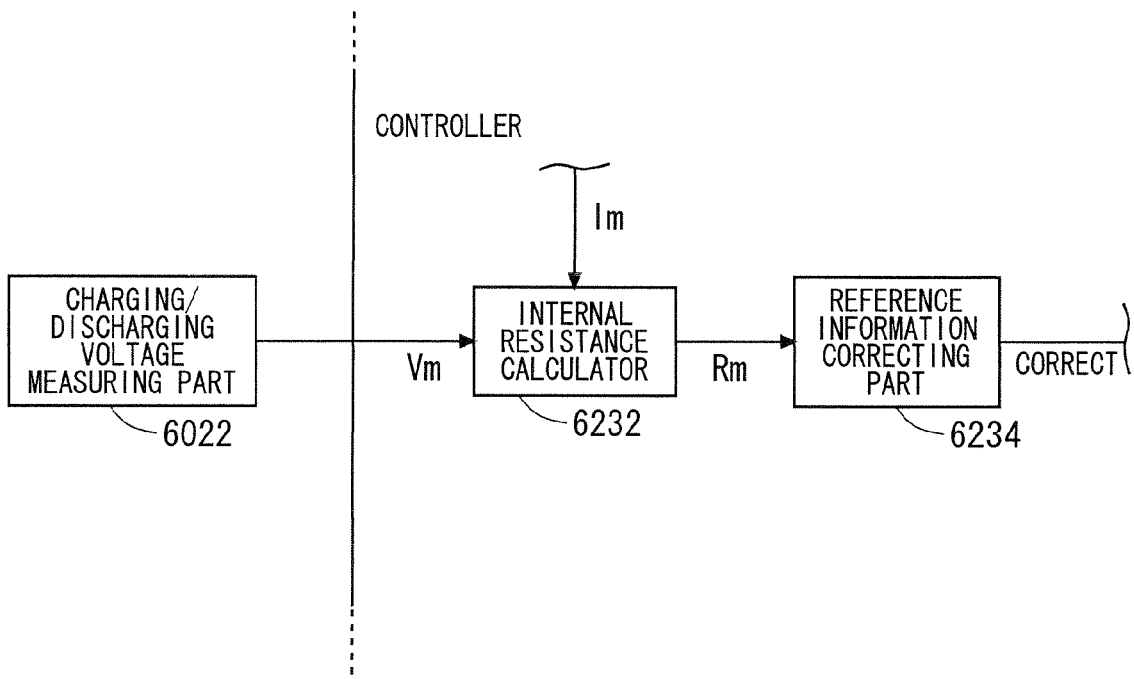
FIG. 22 is a block diagram describing correction of the reference information according to a sixth embodiment.

FIG. 22 is a block diagram describing the correction of the reference information according to the sixth embodiment.

As shown in FIG. 22, in the sixth embodiment, a charging/discharging voltage measuring part 6022 is added to the power storage facility 1002, and an internal resistance calculator 6232 and an information correcting part 6234 are added to the control part 1016 of the power storage facility 1002.

The charging/discharging voltage measuring part 6022 measures a charging/discharging voltage of each of the plurality of NaS batteries 1004.

The internal resistance calculator 6232 calculates an internal resistance of each of the plurality of NaS batteries 1004. The internal resistance calculator 6232 calculates the internal resistance of each of the NaS batteries 1004 based on the measured value Tm of the charging/discharging current measured by each of the charging/discharging current measuring parts 1008 and a measured value Vm of the charging/discharging voltage measured by the charging/discharging voltage measuring part 6022.

The reference information correcting part 6234 makes a correction so that a tilt of a DOD-temperature characteristic line, namely, the change rate of DOD to the temperature is increased with the increasing calculated value Rm of the internal resistance. As a result, when the internal resistance of each of the NaS batteries 1004 becomes high, the second upper limit U2m becomes small, and thus the maximum value of the emission power of each of the preferential virtual batteries is suitably set.

When the reference information that is referred to by the upper limit calculator 1208 is the reference information representing the relationship between DOD and the temperature of each of the NaS batteries 1004 and the second upper limit that is described in the fifth embodiment, the reference information correcting part 7234 makes a correction so that when the calculated value Rm of the internal resistance of each of the NaS batteries 1004 becomes high, the second upper limit U2m is decreased in the reference information of the NaS batteries 1004.

Seventh Embodiment

A seventh embodiment relates to correction of the reference information that is desirably made in the power storage facility 1002 in the first embodiment.

Figure 23:
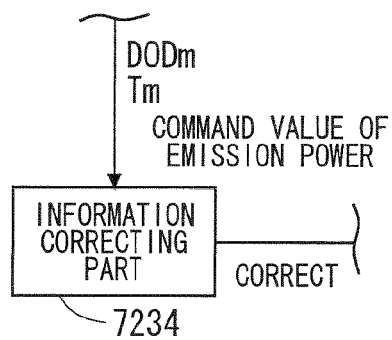
FIG. 23 is a block diagram describing the correction of the reference information according to a seventh embodiment.

FIG. 23 is a block diagram describing the correction of the reference information according to the seventh embodiment.

As shown in FIG. 23, in the seventh embodiment, the reference information correcting part 7234 is added to the control part 1016 of the power storage facility 1002.

The reference information correcting part 7234 makes a correction so that the DOD-temperature characteristic line is brought close to past results of the command value of the emission power output by the command value output part 1220, the calculated value DODm of DOD calculated by the DOD calculator 1204 and the measured value Tm of the temperature measured by each of the temperature sensors 1010. As a result, since the second upper limit U2m is suitably calculated, the maximum value of the emission power of each of the preferential virtual batteries is suitably set. For example, when heat generation from the NaS batteries 1004 increases, the second upper limit U2m becomes small, and thus the maximum value of the emission power of each of the preferential virtual batteries is suitably set.

Eighth Embodiment

An eighth embodiment relates to a power storage network 8002. The power storage network 8002 according to the eighth embodiment is provided with a control apparatus for controlling charging/discharging of a plurality of charging/discharging units. The plurality of control apparatuses compose a hierarchical control apparatus network, a total $\Sigma U1m$ of the total U1m of the first upper limit and a total $\Sigma U2m$ of the second upper limit U2m are posted from a low-order control apparatus to a high-order control apparatus, and the allocation of the emission power to each of the preferential virtual batteries and each of the non-preferential virtual batteries is posted from the high-order control apparatus to the low-order control apparatus. "The charging/discharging unit" means a unit where charging/discharging is carried out independently, and occasionally means the power storage facility that has control apparatuses, or occasionally means the NaS batteries that do not have the control apparatus.

FIG. 24 is a block diagram illustrating the power storage network 8002 according to the eighth embodiment.

As shown in FIG. 24, the charging/discharging in the plurality of NaS batteries 8004 is controlled by a control apparatuses 8006, and the charging/discharging in the plurality of NaS batteries 8008 is controlled by a control apparatus 8010. The plurality of NaS batteries 8004 and the control apparatus 8006 compose a charging/discharging unit 8012, the plurality of NaS batteries 8008 and the control apparatus 8010 also compose the charging/discharging unit 8014. Charging/discharging in the charging/discharging units 8012 and 8014, and in a NaS battery 8016 composing the charging/discharging unit in itself is controlled by a control apparatus 8018. The charging/discharging units 8012 and 8014, the NaS battery 8016 and the control apparatus 8018 compose a larger charging/discharging unit 8020.

Similarly, charging/discharging in a plurality of NaS batteries 8022 is controlled by a control apparatus 8024. The plurality of NaS batteries 8022 and the control apparatus 8024 compose a charging/discharging unit 8026. Charging/discharging in the charging/discharging unit 8026 and in a NaS battery 8028 composing a charging/discharging unit in itself are controlled by a control apparatus 8030. The charging/discharging unit 8026, the NaS batteries 8028 and the control apparatus 8030 compose a larger charging/discharging unit 8032.

Charging/discharging in the charging/discharging units 8020 and 8032 are controlled by a control apparatus 8034.

The control apparatuses 8006, 8010, 8018, 8024, 8030 and 8034 regard the charging/discharging units as the NaS batteries, and control the charging/discharging units similarly to the control apparatus according to the first embodiment or a control apparatus where the modifications described in the second embodiment to the seventh embodiment are added to the control apparatus according to the first embodiment.

The number of the NaS batteries and the control apparatuses included in the power storage network 8002 is increased/decreased according to specifications of the power storage network 8002, and the number of hierarchies in the control apparatus network is increased/decreased according to the specifications of the power storage network 8002.

FIG. 25 is a block diagram illustrating a low-order control apparatus 8102 provided to a first charging/discharging unit and a high-order control apparatus 8104 for controlling the plurality of first charging/discharging units. In the power storage network 8002, for example, the control apparatus 8006 is the low-order control apparatus 8102, and the control apparatus 8018 is the high-order control apparatus 8104, and the charging/discharging units 8012 and 8014, and the NaS battery 8016 are the first charging/discharging unit.

As shown in FIG. 25, the high-order control apparatus 8104 has a communication part 8106 for communicating with the low-order control apparatus 8102, an emission power allocating part 8108 for allocating the emission power to each of the first charging/discharging units, and an absorbed power allocating part 8110 for allocating the absorbed power to each of the first charging/discharging unit.

The communication part 8106 receives the total $\Sigma U1m$ of the first upper limit $U1m$ of each of the plurality of second charging/discharging units and the total $\Sigma U2m$ of the second upper limit $U2m$ of each of the plurality of second charging/discharging units from the low-order control apparatus 8102.

The emission power allocating part 8108 regards the first charging/discharging unit as the NaS battery, and allocates the emission power that is not more than the total $\Sigma U1m$ of the first upper limit $U1m$ of each of the plurality of second charging/discharging units received by the communication part 8106 to each of the plurality of first charging/discharging units. The emission power allocating part separates each of the plurality of first charging/discharging units into a preferential virtual battery to which the non-excess of the emission power that does not exceed the total $\Sigma U2m$ of the second upper limit $U2m$ of each of the plurality of second charging/discharging units is allocated and a non-preferential virtual battery to which the excess of the emission power that exceeds the total $\Sigma U2m$ is allocated, allocates the emission power to all of the plurality of preferential virtual batteries, and then allocates the emission power to each of the non-preferential virtual batteries.

The absorbed power allocating part 8110 regards the first charging/discharging unit as the NaS battery, and allocates the emission power that is not more than a total $\Sigma U3m$ of the third upper limit $U3m$ of each of the plurality of second charging/discharging units received by the communication part 8106 to each of the plurality of the first charging/discharging units.

The low-order control apparatus 8102 has an emission power allocating part 8112 for allocating the emission power that is not more than the first upper limit $U1m$ to each of the plurality of second charging/discharging units, an absorbed power allocating part 8114 for allocating the absorbed power that is not more than the third upper limit $U3m$ to each of the plurality of second charging/discharging units, an upper limit calculator 8116 for calculating the second upper limit $U2m$ of the emission power for maintaining the temperature of each of the secondary batteries included in each of the plurality of second charging/discharging units at the upper limit temperature or less, and a communication part 8118 for communicating with the high-order control apparatus 8104.

The emission power allocating part 8112 regards the second charging/discharging unit as the NaS battery, separates each of the plurality of second charging/discharging units into a preferential virtual battery to which the emission power not more than the second upper limit $U2m$ is allocated and a non-preferential virtual battery to which the emission power exceeding the second upper limit is allocated, allocates the emission power to all the plurality of preferential virtual batteries, and then allocates the emission power to each of the non-preferential virtual batteries.

The absorbed power allocating part 8114 regards the second charging/discharging unit as the NaS battery, and allocates the absorbed power not more than the third upper limit $U3m$ to each of the plurality of second charging/discharging units.

The communication part 8118 transmits the totals $\Sigma U1m$, $\Sigma U2m$ and $\Sigma U3m$ of the first upper limit $U1m$, the second upper limit $U2m$ and the third upper limit $U3m$ of each of the plurality of second charging/discharging units to the high-order control apparatus 8104.

In such a manner, the plurality of control apparatuses are provided, information is exchanged between the high-order control apparatus 8104 and the low-order control apparatus 8102, and thus processes executed by one control apparatus reduce, thereby facilitating the control of the charging/discharging in the many NaS batteries.

Ninth Embodiment

A ninth embodiment relates to a microgrid 9004 including the power storage facility 9002.

Figure 26:
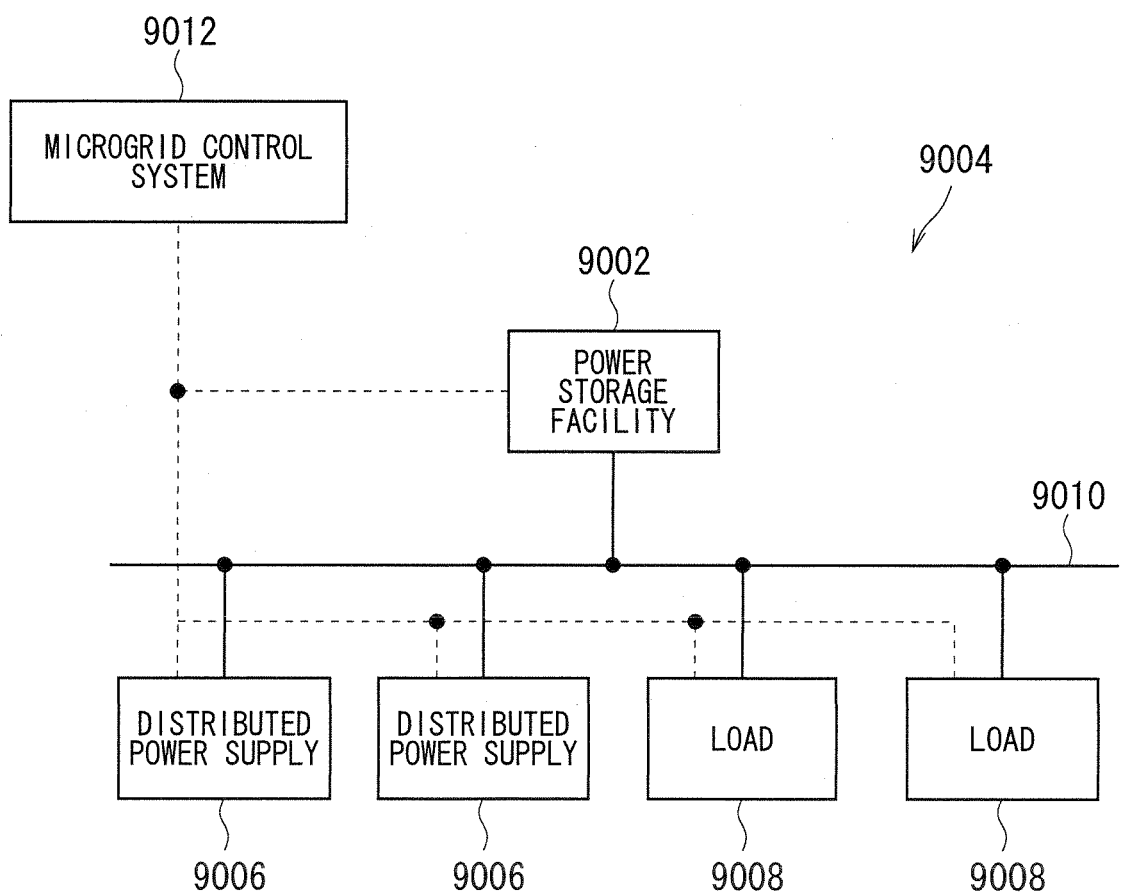
FIG. 26 is a block diagram illustrating a microgrid according to a ninth embodiment.

FIG. 26 is a block diagram illustrating the microgrid 9004 according to the ninth embodiment. "The microgrid" is a small-scale power supply network where a distributed power supply is installed in a power demand place, and called also "a distributed energy system" or the like. As shown in FIG. 26, in the microgrid 9004, a distributed power supply 9006, a load 9008 and the power storage facility 9002 are connected to a system 9010. Operations of the distributed power supply 9006, the load 9008 and the power storage facility 9002 are controlled by a microgrid control system 9012.

The distributed power supply 9006 is not particularly limited, but a generator utilizing solar light and the other natural energies, such as a solar photovoltaic device is used. A fuel cell or the like that uses gases as fuel manufactured by using garbage, waste wood, waste plastic and the like as raw materials may be used as the distributed power supply 9006.

All or some of the power generated by the distributed power supply 9006 are transmitted to the power storage facility 9002 via the system 9010, and are accumulated in the power storage facility 9002.

As the power storage facility, the power storage facility 1002 in the first embodiment, a power storage facility in which the modifications described in the second embodiment to the seventh embodiment are added to the power storage facility 1002 in the first embodiment, or a power storage network 8002 in the eighth embodiment is adopted.

<Others>

The present invention was described in detail, but the above description is the example from all aspects, and thus the present invention is not limited to the above description. Numberless modified examples, not illustrated, can be assumed without departing from the scope of the present invention. Particularly, the described items are deservingly scheduled to be combined.

EXPLANATIONS OF LETTERS OR NUMERALS

1004 NaS battery
1008 Hall current detector
1010 temperature sensor
1012 bidirectional converter

The invention claimed is:

1. A control apparatus for controlling a plurality of secondary batteries, comprising:
 a charging/discharging current measuring part for measuring a charging/discharging current of each of the plurality of secondary batteries;
 a temperature sensor for measuring a temperature of each of the plurality of secondary batteries;
 a depth-of-discharge calculator for calculating a depth-of-discharge of each of the plurality of secondary batteries based on a measured value of the charging/discharging current measured by said charging/discharging current measuring part;

an emission power allocating part for allocating emission power not more than a first upper limit to each of the plurality of secondary batteries;

an upper limit calculator for calculating a second upper limit of the emission power with which the temperature is maintained at an upper limit temperature or less based on the measured value of the temperature measured by said temperature sensor and a calculated value of the depth-of-discharge calculated by said depth-of-discharge calculator in each of the plurality of secondary batteries;

a command value output part for outputting a command value of emission/absorbed power; and a bidirectional converter for controlling charging/discharging in each of the plurality of secondary batteries so that the absorbed/emission power becomes the command value output by said command value output part, wherein said emission power allocating part separates each of the plurality of secondary battery into a preferential virtual battery to which a non-excess of the emission power that does not exceed the second upper limit calculated by said upper limit calculator is allocated and a non-preferential virtual battery to which an excess of the emission power that exceeds the second upper limit calculated by said upper limit calculator is allocated, allocates the emission power to all the plurality of preferential virtual batteries and then allocates the emission power to each of the non-preferential virtual batteries, and said command value output part outputs a total of the emission power allocated to each of the preferential virtual batteries by said emission power allocating part and the emission power allocated to each of the non-preferential virtual batteries by said emission power allocating part as the command value.

2. The control apparatus according to claim 1, wherein said upper limit calculator sets a maximum value of the discharging power for enabling continuous discharge until the depth-of-discharge reaches 100% as the second upper limit.

3. The control apparatus according to claim 1, wherein said upper limit calculator sets a maximum value of the emission power for enabling continuous discharge until set time passes as the second upper limit.

4. The control apparatus according to claim 1, wherein
said upper limit calculator refers to reference information in which a relationship between the depth-of-discharge and the temperature of each of the secondary batteries at the time of discharging is described so as to calculate the second upper limit, and
said control apparatus further comprises:
a charging/discharging voltage measuring part for measuring a charging/discharging voltage in each of the plurality of secondary batteries;
an internal resistance calculator for calculating an internal resistance in each of the plurality of secondary batteries based on a measured value of the charging/discharging current measured by said charging/discharging current measuring part and a measured value of the charging/discharging voltage measured by said charging/discharging voltage measuring part; and
a reference information correcting part for correcting the reference information so that a rate of increase in the temperature to the depth-of-discharge is increased with an increasing calculated value of the internal resistance calculated by said internal resistance calculator.

5. The control apparatus according to claim 1, wherein
said upper limit calculator refers to reference information in which a relationship between the depth-of-discharge and the temperature of each of the secondary batteries at the time of discharging and the second upper limit is described so as to calculate the second upper limit, and
said control apparatus further comprises:
a charging/discharging voltage measuring part for measuring a charging/discharging voltage in each of the plurality of secondary batteries;
an internal resistance calculator for calculating an internal resistance in each of the plurality of secondary batteries based on a measured value of the charging/discharging current measured by said charging/discharging current measuring part and a measured value of the charging/discharging voltage measured by said charging/discharging voltage measuring part; and
a reference information correcting part for correcting the reference information so that the second upper limit is reduced with an increasing calculated value of the internal resistance calculated by said internal resistance calculator.

6. The control apparatus according to claim 1, wherein
said upper limit calculator refers to reference information in which a relationship between the depth-of-discharge and the temperature in each of the secondary batteries at the time of discharging is described so as to calculate the second upper limit, and
said control apparatus further comprises:
a reference information correcting part for making a correction so that the reference information is brought close to past results of the command value of the emission power output by said command value output part, the calculated value of the depth-of-discharge calculated by said depth-of-discharge calculator and the measured value of the temperature measured by said temperature sensor.

7. The control apparatus according to claim 1, wherein when the emission power is composed of an effective power component and a reactive power component, said emission power allocating part allocates the effective power component and then allocates the reactive power component so that apparent power to be allocated to each of the plurality of secondary batteries becomes the first upper limit or less and effective power to be allocated to each of the plurality of preferential virtual batteries becomes the second upper limit or less calculated by said upper limit calculator.

8. The control apparatus according to claim 1, further comprising:
a state-of-charge calculator for calculating a state-of-charge in each of the plurality of secondary batteries based on the measured value of the charging/discharging current measured by said charging/discharging current measuring part; and
a first order-of-emission-priority giving part for giving an order-of-emission-priority to each of the plurality of preferential virtual batteries, wherein
said emission power allocating part allocates the emission power to each of the preferential virtual batteries in descending manner of the order-of-emission-priority given by said first order-of-emission-priority giving part, and
said first order-of-emission-priority giving part raises the order-of-emission-priority with an increasing difference of a calculated value of the state-of-charge in each of secondary batteries including the preferential virtual batteries calculated by said state-of-charge calculator from a target value.

9. The control apparatus according to claim 1, further comprising:
- a state-of-charge calculator for calculating a state-of-charge in each of the plurality of secondary batteries based on the measured value of the charging/discharging current measured by said charging/discharging current measuring part; and
- a first emission-priority-degree-segment determiner for carrying out stratification on the plurality of preferential virtual batteries and determining an emission-priority-degree-segment to which each of the plurality of preferential virtual batteries belongs, wherein
- said emission power allocating part allocates the emission power to each of the preferential virtual batteries in descending manner of the belonging emission-priority-degree-segment determined by said first emission-priority-degree-segment determiner, and
- said first emission-priority-degree-segment determiner raises the emission-priority-degree-segment with an increasing difference of calculated value of state-of-charge in each of the secondary batteries including the preferential virtual battery calculated by said state-of-charge calculator from a target value.

10. The control apparatus according to claim 9, further comprising:
- a first intra-segment-order-of-emission-priority giving part for giving an intra-segment-order-of-emission-priority to each of the preferential virtual batteries in each of the emission-priority-degree-segments, wherein
- said emission power allocating part allocates the emission power to each of the preferential virtual batteries belonging to the same emission-priority-degree-segment in descending manner of the intra-segment-order-of-emission-priority given by said first intra-segment-order-of-emission-priority giving part, and
- said first intra-segment-order-of-emission-priority giving part raises the intra-segment-order-of-emission-priority with an increasing ratio of the second upper limit of each of the secondary batteries including the preferential virtual batteries calculated by said upper limit calculator to the first upper limit.

11. The control apparatus according to claim 9, further comprising:
- a first intra-segment-order-of-emission-priority giving part for giving an intra-segment-order-of-emission-priority to each of the preferential virtual batteries in each of the emission-priority-degree-segments, wherein
- said emission power allocating part allocates the emission power to each of the preferential virtual batteries belonging to the same emission-priority-degree-segment in descending manner of the intra-segment-order-of-emission-priority given by said first intra-segment-order-of-emission-priority giving part,
- said first intra-segment-order-of-emission-priority giving part raises the intra-segment-order-of-emission-priority with a decreasing difference of the measured value of the temperature in each of the secondary batteries including the preferential virtual batteries measured by said temperature sensor from a reference value.

12. The control apparatus according to claim 9, further comprising:
- a first intra-segment-order-of-emission-priority giving part for giving an intra-segment-order-of-emission-priority to each of the preferential virtual batteries in each of the emission-priority-degree-segments, wherein
- said emission power allocating part allocates the emission power to each of the preferential virtual batteries belonging to the same emission-priority-degree-segment in descending manner of the intra-segment-order-of-emission-priority given by said first intra-segment-order-of-emission-priority giving part, and
- said first intra-segment-order-of-emission-priority giving part raises the intra-segment-order-of-emission-priority with the decreasing measured value of the temperature of each of the secondary batteries including the preferential virtual batteries measured by said temperature sensor.

13. The control apparatus according to claim 1, further comprising:
- a second order-of-emission-priority giving part for giving an order-of-emission-priority to each of the plurality of non-preferential virtual batteries, wherein
- said emission power allocating part allocates emission power to each of the non-preferential virtual batteries in descending manner of the order-of-emission-priority given by said second order-of-emission-priority giving part, and
- said second order-of-emission-priority giving part raises the order-of-emission-priority with an increasing ratio of the second upper limit of each of the secondary batteries including the non-preferential virtual batteries calculated by said upper limit calculator to the first upper limit.

14. The control apparatus according to claim 1, further comprising:
- a second order-of-emission-priority giving part for giving an order-of-emission-priority to each of the plurality of non-preferential virtual batteries, wherein
- said emission power allocating part allocates the emission power to each of the non-preferential virtual batteries in descending manner of the order-of-emission-priority given by said second order-of-emission-priority giving part, and
- said second order-of-emission-priority giving part raises the order-of-emission-priority with a decreasing difference of the measured value of the temperature of each of the secondary batteries including the non-preferential virtual batteries measured by said temperature sensor from a reference value.

15. The control apparatus according to claim 1, further comprising:
- a second order-of-emission-priority giving part for giving an order-of-emission-priority to each of the plurality of non-preferential virtual batteries, wherein
- said emission power allocating part allocates the emission power to each of the non-preferential virtual batteries in descending manner of the order-of-emission-priority given by said second order-of-emission-priority giving part, and
- said second order-of-emission-priority giving part raises the order-of-emission-priority with the decreasing measured value of the temperature of each of the secondary batteries including the non-preferential virtual batteries measured by said temperature sensor.

16. The control apparatus according to claim 1, further comprising:
- a second emission-priority-degree-segment determiner for carrying out stratification on the plurality of non-preferential virtual batteries and determining an emission-priority-degree-segment to which each of the plurality of non-preferential virtual batteries belongs, wherein
- said emission power allocating part allocates the emission power to each of the non-preferential virtual batteries in descending manner of the belonging emission-prioritydegree-segment determined by said second emission-priority-degree-segment determiner, and said second emission-priority-degree-segment determiner raises the emission-priority-degree-segment with an increasing ratio of the second upper limit of each of the second batteries including the non-preferential virtual batteries calculated by said upper limit calculator to the first upper limit.

17. The control apparatus according to claim 1, further comprising:

a second emission-priority-degree-segment determiner for carrying out stratification on the plurality of non-preferential virtual batteries so as to determine an emission-priority-degree-segment to which each of the plurality of non-preferential virtual batteries belongs, wherein said emission power allocating part allocates the emission power to each of the non-preferential virtual batteries in descending manner of the belonging emission-priority-degree-segment determined by said second emission-priority-degree-segment determiner, and said second emission-priority-degree-segment determiner raises the emission-priority-degree-segment with a decreasing difference of the measured value of the temperature of each of the secondary batteries including the non-preferential virtual batteries measured by said temperature sensor from a reference value.

18. The control apparatus according to claim 1, further comprising:

a second emission-priority-degree-segment determiner for carrying out stratification on the plurality of non-preferential virtual batteries so as to determine an emission-priority-degree-segment to which each of the plurality of non-preferential virtual batteries belongs, wherein said emission power allocating part allocates the emission power to each of the non-preferential virtual batteries in descending manner of the belonging emission-priority-degree-segment determined by said second emission-priority-degree-segment determiner, and said second emission-priority-degree-segment determiner raises the emission-priority-degree-segment with the decreasing measured value of the temperature of each of the secondary batteries including the non-preferential virtual batteries measured by said temperature sensor.

19. The control apparatus according to claim 16, further comprising:

a second intra-segment-order-of-emission-priority giving part for giving an intra-segment-order-of-emission-priority to each of the non-preferential virtual batteries in each of the emission-priority-degree-segments; and a charging/discharging cycle counter for counting the number of charging/discharging cycles in each of the plurality of secondary batteries, wherein said emission power allocating part allocates the emission power to each of the non-preferential virtual batteries belonging to the same emission-priority-degree-segment in descending manner of the intra-segment-order-of-emission-priority given by said second intra-segment-order-of-emission-priority giving part, and said second intra-segment-order-of-emission-priority giving part raises the intra-segment-order-of-emission-priority with the decreasing the number of charging/discharging cycles in each of the secondary batteries including the preferential virtual batteries counted by said charging/discharging cycle counter.

20. The control apparatus according to claim 16, further comprising:

a second intra-segment-order-of-emission-priority giving part for giving an intra-segment-order-of-emission-priority to each of the non-preferential virtual batteries in each of the emission-priority-degree-segments, wherein said emission power allocating part allocates the emission power to each of the non-preferential virtual batteries belonging to the same emission-priority-degree-segment in descending manner of the intra-segment-order-of-emission-priority given by said second intra-segment-order-of-emission-priority giving part, and said second intra-segment-order-of-emission-priority giving part cyclically shuffles each of the intra-segment-orders-of-emission-priority over time.

21. The control apparatus according to claim 1, further comprising:

an order-of-absorption-priority giving part for giving an order-of-absorption-priority to each of the plurality of secondary batteries; and an absorbed power allocating part for allocating absorbed power not more than a third upper limit to each of the plurality of secondary batteries, wherein said absorbed power allocating part allocates the absorbed power to each of secondary batteries in descending manner of the order-of-absorption-priority given by said order-of-absorption-priority giving part, said order-of-absorption-priority giving part raises the order-of-emission-priority with an increasing ratio of the second upper limit calculated by said upper limit calculator to the first upper limit, and said command value output part outputs the absorbed power allocated by said absorbed power allocating part as the command value.

22. The control apparatus according to claim 1, further comprising:

an order-of-absorption-priority giving part for giving an order-of-absorption-priority to each of the plurality of secondary batteries; and an absorbed power allocating part for allocating absorbed power not more than a third upper limit to each of the plurality of secondary batteries, wherein said absorbed power allocating part allocates the absorbed power to each of the secondary batteries in descending manner of the order-of-absorption-priority given by said order-of-absorption-priority giving part, the order-of-absorption-priority giving part raises the order-of-absorption-priority with a decreasing temperature difference of the measured value of the temperature measured by said temperature sensor from a reference value, and said command value output part outputs the absorbed power allocated by said absorbed power allocating part as the command value.

23. The control apparatus according to claim 1, further comprising:

an order-of-absorption-priority giving part for giving an order-of-absorption-priority to each of the plurality of secondary batteries; and an absorbed power allocating part for allocating absorbed power not more than a third upper limit to each of the plurality of secondary batteries, wherein said absorbed power allocating part allocates the absorbed power to each of the secondary batteries in descending manner of the order-of-absorption-priority given by said order-of-absorption-priority giving part, said order-of-absorption-priority giving part raises the order-of-absorption-priority with the decreasing measured value of the temperature measured by said temperature sensor, and said command value output part outputs the absorbed power allocated by said absorbed power allocating part as the command value.

24. The control apparatus according to claim 1, further comprising:

a state-of-charge calculator for calculating a state-of-charge in each of the plurality of secondary batteries based on a measured value of the charging/discharging current measured by said charging/discharging current measuring part;

an order-of-absorption-priority giving part for giving an order-of-absorption-priority to each of the plurality of secondary batteries; and an absorbed power allocating part for allocating absorbed power not more than a third upper limit to each of the plurality of secondary batteries, wherein said absorbed power allocating part allocates the absorbed power to each of the secondary batteries in descending manner of the order-of-absorption-priority given by said order-of-absorption-priority giving part, said order-of-absorption-priority giving part raises the order-of-absorption-priority with a decreasing difference of a calculated value of the state-of-charge calculated by said state-of-charge calculator from a target value, and said the command value output part outputs the absorbed power allocated by said absorbed power allocating part as the command value.

25. The control apparatus according to claim 1, further comprising:

an absorption-priority-degree-segment determiner for carrying out stratification on the plurality of secondary batteries so as to determine an absorption-priority-degree-segment to which each of the plurality of secondary batteries belongs; and an absorbed power allocating part for allocating absorbed power not more than a third upper limit to each of the plurality of secondary batteries, wherein said absorbed power allocating part allocates the absorbed power to each of the secondary batteries in descending manner of the belonging absorption-priority-degree-segment determined by said absorption-priority-degree-segment determiner, said absorption-priority-degree-segment determiner raises the absorption-priority-degree-segment with an increasing ratio of the second upper limit calculated by said upper limit calculator to the first upper limit, and said command value output part outputs the absorbed power allocated by said absorbed power allocating part as the command value.

26. The control apparatus according to claim 1, further comprising:

an absorption-priority-degree-segment determiner for carrying out stratification on the plurality of secondary batteries so as to determine an absorption-priority-degree-segment to which each of the plurality of secondary battery belongs; and an absorbed power allocating part for allocating absorbed power not more than a third upper limit to each of the plurality of secondary batteries, wherein said absorbed power allocating part allocates the absorbed power to each of the secondary batteries in descending manner of the belonging absorption-priority-degree-segment determined by said absorption-priority-degree-segment determiner, said absorption-priority-degree-segment determiner raises the absorption-priority-degree-segment with a decreasing difference of the measured value of the temperature measured by said temperature sensor from a reference value, and said command value output part outputs the absorbed power allocated by said absorbed power allocating part as the command value.

27. The control apparatus according to claim 1, further comprising:

an absorption-priority-degree-segment determiner for carrying out stratification on the plurality of secondary batteries so as to determine an absorption-priority-degree-segment to which each of the plurality of secondary batteries belongs; and an absorbed power allocating part for allocating absorbed power not more than a third upper limit to each of the plurality of secondary batteries, wherein said absorbed power allocating part allocates the absorbed power to each of the secondary batteries in descending manner of the belonging absorption-priority-degree-segment determined by said absorption-priority-degree-segment determiner, said absorption-priority-degree-segment determiner raises the absorption-priority-degree-segment with the decreasing measured value of the temperature measured by said temperature sensor, and said command value output part outputs the absorbed power allocated by said absorbed power allocating part as the command value.

28. The control apparatus according to claim 1, further comprising:

a state-of-charge calculator for calculating a state-of-charge in each of the plurality of secondary batteries based on a measured value of the charging/discharging current measured by said charging/discharging current measuring part, an absorption-priority-degree-segment determiner for carrying out stratification on the plurality of secondary batteries so as to determine an absorption-priority-degree-segment to which each of the plurality of secondary batteries belongs; and an absorbed power allocating part for allocating absorbed power not more than a third upper limit to each of the plurality of secondary batteries, wherein said absorbed power allocating part allocates the absorbed power to each of the secondary batteries in descending manner of the belonging absorption-priority-degree-segment determined by said absorption-priority-degree-segment determiner, said absorption-priority-degree-segment determiner raises the absorption-priority-degree-segment with a decreasing difference of the calculated value of the state-of-charge calculated by said state-of-charge calculator from a target value, and said command value output part outputs the absorbed power allocated by said absorbed power allocating part as the command value.

29. The control apparatus according to claim 25, further comprising:

an intra-segment-order-of-absorption-priority giving part for giving an intra-segment-order-of-absorption-priority to each of the secondary batteries in each of the absorption-priority-degree-segments; and a charging/discharging cycle counter for counting the number of charging/discharging cycles of each of the plurality of secondary batteries, wherein said absorbed power allocating part allocates absorbed power to each of the secondary batteries belonging to the same absorption-priority-degree-segment in descending manner of the intra-segment-order-of-absorption-priority given by said intra-segment-order-of-absorption-priority giving part, and said intra-segment-order-of-absorption-priority giving part raises the intra-segment-order-of-absorption-priority with the decreasing the number of charging/discharging cycles counted by said charging/discharging cycle counter.

30. The control apparatus according to claim 25, further comprising:

an intra-segment-order-of-absorption-priority giving part for giving an intra-segment-order-of-absorption-priority to each of the secondary batteries in each of the absorption-priority-degree-segments, wherein said absorbed power allocating part allocates absorbed power to each of the secondary batteries belonging to the same absorption-priority-degree-segment in descending manner of the intra-segment-order-of-absorption-priority given by said intra-segment-order-of-absorption-priority giving part, and said intra-segment-order-of-absorption-priority giving part cyclically shuffles the intra-segment-orders-of absorption-priority over time.

31. The control apparatus according to claim 28, further comprising:

an intra-segment-order-of-absorption-priority giving part for giving an intra-segment-order-of-absorption-priority to each of the secondary batteries in each of the absorption-priority-degree-segments, wherein said absorbed power allocating part allocates the emission power to each of the secondary batteries belonging to the same absorption-priority-degree-segment in descending manner of the intra-segment-order-of-absorption-priority given by said intra-segment-order-of-absorption-priority giving part, and said intra-segment-order-of-absorption-priority giving part raises the intra-segment-order-of-absorption-priority with an increasing ratio of the second upper limit calculated by said upper limit calculator to the first upper limit.

32. The control apparatus according to claim 28, further comprising:

an intra-segment-order-of-absorption-priority giving part for giving an intra-segment-order-of-absorption-priority to each of the preferential virtual batteries in each of the absorption-priority-degree-segments, wherein said absorbed power allocating part allocates the absorbed power to each of the secondary batteries belonging to the same absorption-priority-degree-segment in descending manner of the intra-segment-order-of-absorption-priority given by said intra-segment-order-of-absorption-priority giving part, and said intra-segment-order-of-absorption-priority giving part raises the intra-segment-order-of-absorption-priority with a decreasing difference of the measured value of the temperature measured by said temperature sensor from a reference value.

33. The control apparatus according to claim 28, further comprising:

an intra-segment-order-of-absorption-priority giving part for giving an intra-segment-order-of-absorption-priority to each of the secondary batteries in each of the absorption-priority-degree-segments, wherein said absorbed power allocating part allocates the absorbed power to each of the secondary batteries belonging to the same absorption-priority-degree-segment in descending manner of the intra-segment-order-of-absorption-priority given by said intra-segment-order-of-absorption-priority giving part, and said intra-segment-order-of-absorption-priority giving part raises the intra-segment-order-of-absorption-priority with the increasing measured value of the temperature measured by said temperature sensor.

34. A control apparatus network having a plurality of control apparatuses for controlling a plurality of first charging/discharging units and a plurality of second charging/discharging units, the control apparatus network comprising:

a high-order control apparatus for controlling a plurality of first charging/discharging units; and a low-order control apparatus that is provided to at least some of the first charging/discharging units, for controlling at least one of the plurality of second charging/discharging units, wherein said high-order control apparatus has;

a first communication part for communicating with the low-order control apparatus and, a first emission power allocating part for allocating emission power to each of the plurality of first charging/discharging units, said first communication part receives a total of a first upper limit of each of the plurality of second charging/discharging units and a total of a second upper limit of each of the plurality of second charging/discharging units from said low-order control apparatus, said first emission power allocating part allocates the emission power that is not more than the total of the first upper limit of each of the plurality of second charging/discharging units received from said communication part to each of the plurality of first charging/discharging units, separates each of the plurality of first charging/discharging units into a preferential virtual battery to which a non-excess of emission power that does not exceed the total of the second upper limit of each of the plurality of second charging/discharging units is allocated and a non-preferential virtual battery to which an excess of emission power that exceeds the total of the second upper limit of each of the plurality of second charging/discharging units is allocated, allocates the emission power to all the plurality of preferential virtual batteries and then allocates the emission power to each of the non-preferential virtual batteries, said low-order control apparatus has;

a second emission power allocating part for allocating emission power not more than the first upper limit to each of the plurality of second charging/discharging units, an upper limit calculator for calculating a second upper limit of the emission power for maintaining the temperature of each secondary battery included in the plurality of second charging/discharging units at an upper limit temperature or less, and a second communication part for communicating with the high-order control apparatus, said second emission power allocating part separates each of the plurality of second charging/discharging units into a preferential virtual battery to which a non-excess of the emission power that does not exceed the second upper limit calculated by said upper limit calculator is allocated and a non-preferential virtual battery to which an excess of the emission power that exceed the second upper limit calculated by said upper limit calculator is allocated, allocates the emission power to all the plurality of preferential virtual batteries and then allocates the emission power to each of the non-preferential virtual batteries, and said second communication part transmits a total of the first upper limit in each of the plurality of second charging/discharging units and a total of the second upper limit in each of the plurality of second charging/discharging units to said high-order control apparatus.

35. A control method for controlling a plurality of secondary batteries, comprising the steps of:
- (a) measuring a charging/discharging current in each of the plurality of secondary batteries;
- (b) measuring a temperature of each of the plurality of secondary batteries;
- (c) calculating a depth-of-discharge of each of the plurality of secondary batteries based on a measured value of the charging/discharging current measured at said step (a);
- (d) allocating emission power not more than a first upper limit to each of the plurality of secondary batteries;
- (e) calculating a second upper limit of the emission power for maintaining the temperature at an upper limit temperature or less based on a measured value of the temperature measured at said step (b) and a calculated value of the depth-of-discharge of each of the plurality of secondary batteries calculated at said step (c) in each of the plurality of secondary batteries;
- (f) outputting a command value of emission/absorbed power; and
- (g) controlling charging/discharging of each of the plurality of secondary batteries so that the absorbed/emission power becomes the command value output at said step (f), wherein at said step (d), each of the plurality of secondary batteries is divided into a preferential virtual battery to which a non-excess of the emission power that does not exceed the second upper limit calculated at said step (e) is allocated and a non-preferential virtual batteries to which the emission power that exceeds the second upper limit calculated at said step (e) is allocated, the emission power is allocated to all the plurality of preferential virtual batteries and then the emission power is allocated to each of the non-preferential virtual batteries, and at said step (f), a total of the emission power allocated to each of the preferential virtual batteries at said step (d) and the emission power allocated to each of the non-preferential virtual batteries at said step (d) is output as the command value of the emission power.

* * * * *